United States Patent
DiGiambattista et al.

(10) Patent No.: US 10,382,491 B2
(45) Date of Patent: Aug. 13, 2019

(54) CONTINUOUS SECURITY DELIVERY FABRIC

(71) Applicant: CYBRIC Inc., Boston, MA (US)

(72) Inventors: Ernesto DiGiambattista, Lynnfield, MA (US); Michael D. Kail, Los Gatos, CA (US); Alex Manelis, Palo Alto, CA (US); Salvatore Sclafani, Revere, MA (US)

(73) Assignee: CYBRIC, Inc., Boston, MA (US)

( * ) Notice: Subject to any disclaimer, the term of this patent is extended or adjusted under 35 U.S.C. 154(b) by 191 days.

(21) Appl. No.: 15/430,386

(22) Filed: Feb. 10, 2017

(65) Prior Publication Data
US 2017/0237778 A1    Aug. 17, 2017

Related U.S. Application Data

(60) Provisional application No. 62/294,141, filed on Feb. 11, 2016.

(51) Int. Cl.
| | |
|---|---|
| *H04L 9/00* | (2006.01) |
| *H04L 29/06* | (2006.01) |
| *G06N 20/00* | (2019.01) |
| *G06N 5/04* | (2006.01) |

(52) U.S. Cl.
CPC .............. *H04L 63/20* (2013.01); *G06N 5/048* (2013.01); *G06N 20/00* (2019.01); *H04L 63/1433* (2013.01); *H04L 63/1441* (2013.01)

(58) Field of Classification Search
CPC . H04L 63/20; H04L 63/1433; H04L 63/1441; G06N 20/00; G06N 5/048
See application file for complete search history.

(56) References Cited

U.S. PATENT DOCUMENTS

| | | | |
|---|---|---|---|
| 2009/0138937 A1* | 5/2009 | Erlingsson | H04L 63/1416 726/1 |
| 2014/0250491 A1 | 9/2014 | Fleischman et al. | |
| 2014/0304771 A1 | 10/2014 | Reierson et al. | |
| 2015/0040231 A1* | 2/2015 | Oliphant | G06F 21/57 726/25 |

OTHER PUBLICATIONS

International Search Report and Written Opinion dated Apr. 28, 2017, for PCT Patent Application No. PCT/US2017/017577, 15 pages.

* cited by examiner

*Primary Examiner* — Beemnet W Dada
(74) *Attorney, Agent, or Firm* — Han Santos, PLLC

(57) ABSTRACT

A continuous security delivery fabric is disclosed. One or more security functions, comprising one or more tasks to be performed by a security tool, utility or service is encapsulated in a componentized security policy. The componentized security policies may be scheduled to run against one or more shadow environments, which are substantive copies of an information technology installation. One or more componentized security policies are scheduled as to run substantively continuously with results of the execution of the componentized security policies against the shadow aggregated. Based on automated analysis which may include machine learning, security issues in the actual information technology installation are inferred, and remediation either recommended or automatically executed. Various embodiments, including a microservices infrastructure embodiment are disclosed.

20 Claims, 22 Drawing Sheets

CONTINUOUS SECURITY DELIVERY FABRIC

CROSS-REFERENCE TO RELATED APPLICATION

This patent application claims priority to U.S. Provisional Application Ser. No. 62/294,141, entitled "Continuous Security Delivery Fabric," filed Feb. 11, 2016, and is incorporated by reference herein in its entirety.

BACKGROUND

Present day enterprises have come to rely on mission critical computing systems. Such systems may include automation for accounting, finance, human resources, and other enterprise automation. Without automation, enterprises might not be able to service a large number of customers, would not be able to quickly determine who they owed money to or who owed them money, or be able to collaborate on work product. Indeed, if an enterprise's automation were to be compromised, that enterprise may run the risk of facing losses tantamount to going out of business. Accordingly, the ability for an enterprise to protect, backup, and recover from automation failures and threats is tantamount to ensuring not only the enterprise's health, but its very survival.

Accordingly, in recent years there have been hundreds of tools developed around protecting one's business enterprise, to make it more secure from cyber-attacks. However, the reality is that business enterprises are now less secure than ever. Indeed, an increasing number of breaches reported regularly. It may take over a year to detect, find, and remediate a security breach. The eroding network perimeter of today's modern data center, the increase in mobility and telecommuting, and a dangerous cybersecurity threat landscape perpetrated by malicious actors have created a multi-dimensional challenge for information technology (IT) executives charged with protecting and securing their organization's data assets.

Cloud computing introduces additional challenges. "Cloud native" business enterprises may operate entirely in a public environment, while those with a "cloud first" strategic imperative, typically employ hybrid clouds. In both cases, an increasingly borderless network results in a visibility and control gap where the lack of access to the egress point nearly eliminates the ability to employ traditional security controls.

Today, organizations address this security problem by acquiring an ever increasing number of security tools to automate the protecting, backup, and recovery of their mission critical computing systems. There are a countless number of products available that promise to provide various forms of protection against cyber-attacks. However, different safeguarding software packages, may each have a different focus. One package may protect server side computing instances, but may not protect client side software. Another package may provide proactive security scanning, but may not offer recovery assistance in the case of compromise. Worse, rather than working in concert, different packages may inadvertently act against each other. Presently, there is no technology to orchestrate the response of these diverse safeguarding software packages in a unified and coherent fashion. Furthermore, as a consequence of there being no present orchestration technology, there is no present way for enterprises to perform orchestrated self-healing and response in the event of a security breach.

BRIEF DESCRIPTION OF THE DRAWINGS

The detailed description is described with reference to the accompanying figures, in which the left-most digit(s) of a reference number identifies the FIG. in which the reference number first appears. The use of the same reference numbers in different figures indicates similar or identical items.

DETAILED DESCRIPTION

Figure 1:
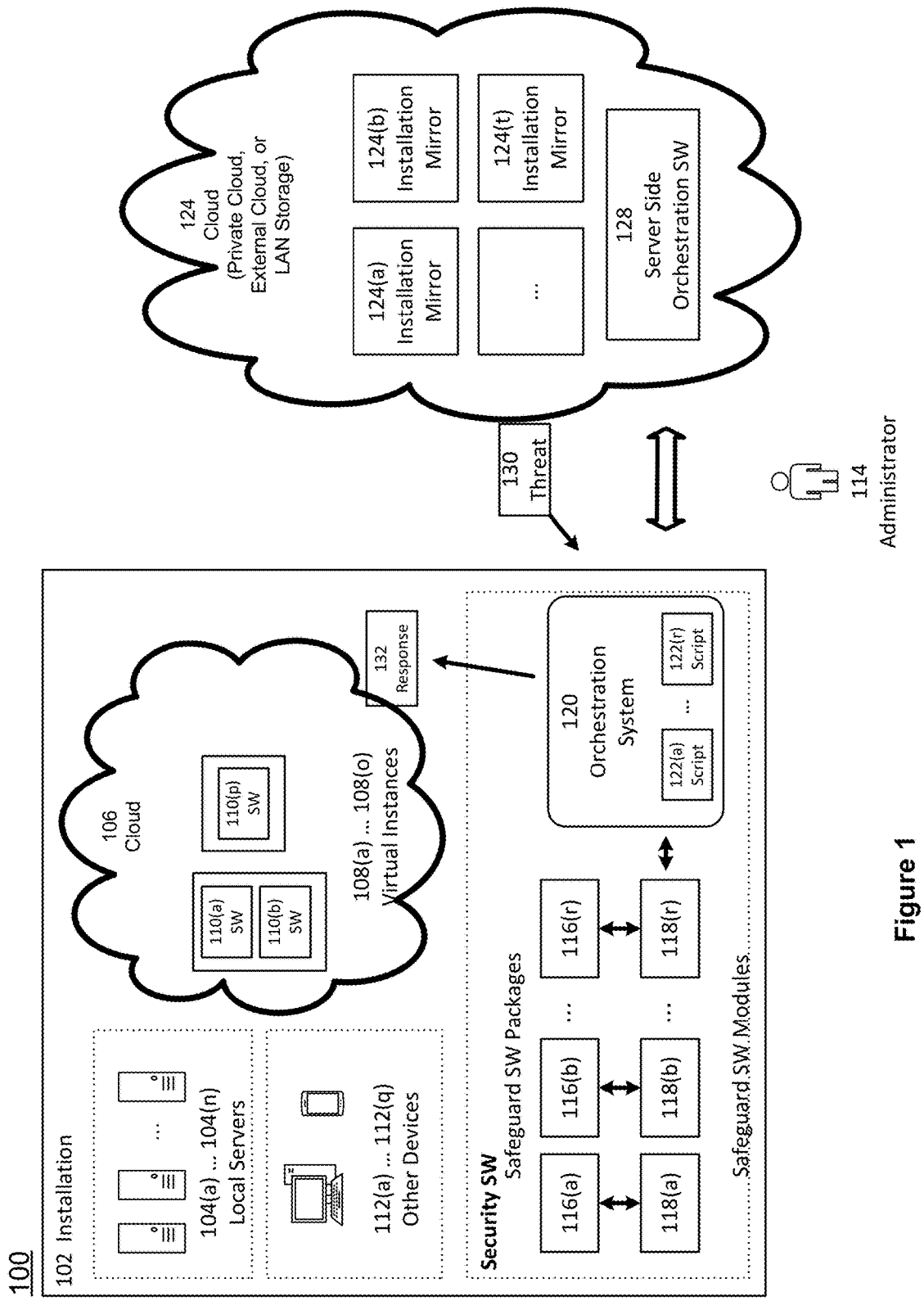
FIG. 1 is a top level context diagram of enterprise level security orchestration.

Context of Enterprise Level Security Orchestration
Overview

This disclosure generally relates to data security, and more particularly, to methods and systems of orchestrating various data security tools to safeguard a business enterprise. Cyber-automation techniques and threat remediation solutions are discussed. By virtue of the techniques discussed herein, business enterprises of various size are able to reduce the time to conduct vulnerability scanning and remediation. In some environments, the reduction of time to conduct the vulnerability scanning and remediation may be reduced from months to minutes.

Today's business enterprises may deploy several safeguarding systems, sometimes referred to herein as safeguard software packages. These security systems may not be orchestrated to act in concert. The orchestration function may be met by providing an orchestration system where different safeguard software packages, have corresponding safeguard software modules to interface a respective safeguard software package with the orchestration system. In this way, the orchestration system could run orchestration routines that utilized some or all of the safeguard software packages to perform security testing or other security functions on the enterprise.

Addressing the above would provide the orchestration portion of enterprise level security orchestration. However, to make the security orchestration function enterprise level, the present system has ability to perform security testing and other security functions isolated from production systems. Accordingly, the orchestration system has access to a mirror of the entire enterprise, in effect creating an enterprise size sandbox. Preparing an orchestration system, interfaced with various safeguard software packages via corresponding safeguard software modules, with access to storage sufficient for business enterprise scale mirroring, and mirroring functions with sufficient performance to perform mirroring in a timely fashion, provides enterprise level security orchestration.

Enterprise level security orchestration enables security testing and safeguarding functions, which are functions that support a security scenario. Scenarios include, without limitation:

Vulnerability scanning,
Active scanning,
Penetration test scanning,
Web application scanning,
End to end scanning,
Software development scanning,
Pre-release scanning,
White hat/Tiger team methodology scanning
Remediation management, and
Reporting management.

The above scenarios need not be performed in a vacuum. Many of the above scenarios are performed in concert with other enterprise operations. By way of example, consider software developer operations which comprise a development life cycle and a test life cycle. Specifically when enterprise critical applications are developed, they are typically developed according to a software development methodology, which compartmentalizes different phases of development. In doing so, the methodology offers checkpoints, where work product, such as documentation and working code, may be tested. By detecting potential problems early in the development cycle, these problems can be prevented from propagating through the enterprise information technology infrastructure.

Enterprise level security orchestration may be applied to the software product under development at predetermined development milestones. Because of the scalable nature of enterprise level security orchestration, multiple mirrors of an installation may be synchronously tested for security. Synchronous testing is described in greater detail with respect to FIG. 5.

The security techniques discussed herein to address these operational security issues have various aspects. First, performing security functions against a shadow environment, which may comprise containers that can be provisioned on-demand, provides an architecture that can expedite invasive security functions without impacting the production environment. Further, leveraging the security system discussed herein to instrument third-party security controls yields greater administrative efficiency by streamlining security workflows that may otherwise require the individual and manual interaction with a series of various security tools and functions.

The Continuous Security Delivery Fabric ("CSDF") discussed herein may be used to automate and optimize enterprise vulnerability scanning and detection, as well as performing remediation. In at least one scenario, the CSDF may be deployed in less than a minute. Further, the intuitive user interface discussed herein can be used to evaluate risk and apply automated security policies to shrink exploit windows. The virtualized shadow environment of the present security system can help organizations improve their security posture and meet compliance requirements in less time and at a lower operational cost.

Cloud-based production environments are often deployed via continuous DevOps methodologies, where there is collaboration between software developers and information technology (IT) professionals to automate the process of software delivery and infrastructure changes. While such methodologies often increase the risk for introducing vulnerabilities, they also afford the opportunity to automate the orchestration of security best practices for improved software development efficiency.

In one aspect, the Continuous Security Delivery Fabric discussed herein provides value for business enterprises that leverage a DevOps methodology to manage software and operations. DevOps-centric business enterprises may expect to gain efficiencies through the automation of procedures by integrating tools via APIs and scripts. However, security vulnerability scanning and remediation can create problems, as these often-serialized tasks are not only manual (and thus time-intensive), but can also lead to downtime for patching, which may substantially impact performance and availability. Since some software developers make multiple copies of their development environments, and API-driven automation tools are employed to automatically provision fleets of workloads to production, security vulnerabilities and potential exploits may be propagated across development environments. In addition, inspecting modified code for vulnerabilities before checking the software into a central repository can be time consuming and difficult to manage, and is therefore a step that is often skipped in the software development process.

In one aspect, the Continuous Security Delivery Fabric (CSDF) described herein lends itself for business enterprises that use DevOps methodology. For example, organizations that employ DevOps may have moved their operations to the cloud to gain the advantages of on-demand resource allocation at scale, rich platform services, cloud-based CDM, and software-as-a-service. The Continuous Security Delivery Fabric discussed herein can accommodate such cloud environments because it can use the elastic infrastructure for its shadow environments. In various embodiments, the CSDF system's support for third-party application programming interfaces (APIs) facilitates the system's integration into DevOps ticketing systems, reporting infrastructures, and code management applications.

Example System Architecture

FIG. 1 provides an example architecture for implementing a CSDF. Business enterprise have an information technology installation 102 comprising various computing, networking, and storage devices used by the business enterprise and their software. An installation 102 may include several local servers 104(a) through 104(n), sited on the enterprise's premises. An installation may also include cloud infrastructure 106 provided by one or more cloud providers on one or more cloud virtual instances 108(a) through 108(o). On those local servers 104(a-n) and/or the cloud virtual instances 108(a) though 108(n), the enterprise may install enterprise software systems 110(a) through 110(p) that automate enterprise operations across the enterprise, such as accounting, finance, customer relations management.

An installation 102 is not limited to server side. An installation may include other devices 112(a) through 112(q) that may include client personal computers, tablets, cell phone, and other mobile devices, along with their respective client software.

An installation 102 is generally overseen by an administrator 114, whose responsibilities include the security of the installation 102. Accordingly, the administrator 114 may deploy a number of commercially available safeguard software packages 116(a) through 116(r). Exemplary safeguard software packages 116 may include, but are not limited to, Qualys™, Check Point Software™, Fortinet™, Rapid7, Core Security™, Symantec™, etc. In general, a safeguard software package 116 is any software package deployed by the administrator to perform a safeguarding or security function. These packages may work with the other safeguard software packages 116.

In one embodiment, each safeguard software package 116(a) through 116(r), has a corresponding safeguard software module 118(a) through 118(r). Because different safeguard software packages 116(a-r) have a different automation and different functions, and because the safeguard software packages 116(a-r) are likely to have changing versions over time, the safeguard software modules 118(a-r) provide a layer of software to provide a consistent interface to abstract away the changing nature of the underlying safeguard software packages 116.

The safeguard software modules 118(a-r) interface to an installation side orchestration system 120. The orchestration system provides the administrator 114 with a user interface, including a dashboard to receive notifications and alerts from the safeguard software packages 116 in an integrated fashion. The user interface is described in detail in a later section in the context of dashboards and sub-dashboards (e.g., pages).

The administrator may choose to automate the safeguard software packages 116(a-r), generally in concert with each other. This is accomplished via, orchestration routines 122(a) through 122(r), referred to herein as a componentized security policy, and also referred to commercially as Business Resiliency Internal Controls (BRICs). Componentized security policies/BRICs are described in greater detail with respect to FIG. 6 below.

In one aspect, a BRIC 122 is a script that can make calls to the safeguard software packages 116(a-r), via the automation interfaces provided by the safeguard software modules 118(a-r). Specifically, after an administrator programs and deploys a BRIC 122 to run at specified times and/or predetermined intervals, the orchestration system 120 will run the BRIC 122 at the predetermined time via a runtime that is part of the orchestration system 120. When the BRIC invokes a call to a safeguard software package 116, the runtime calls the respective safeguard software module 118, which in turn performs the automation call specific to the safeguard software package 116. For example, if the safeguard package 116 proffers a Component Object Module or .NET™ interface, the safeguard software module 118 will be configured to invoke such interfaces. If the safeguard package 116 does not have native automation, automation may be performed through alternatives, such as journaling hooks.

The orchestration system 120 executes the BRICs 122 and is configured to receive the results of the safeguarding and security operations, such as passive and active scans. Accordingly, the orchestration system can include an analytics function that stores the results, performs analysis, and detects patterns of threats. The administrator 114 may change the configuration of the safeguard packages to close off threats. In some cases, the orchestration system 120 may automatically respond to block threats. Such automation may also be performed by the programmed BRICs 122(a-r).

BRICs 122(a) to 122(r) may implement different security methodologies. Accordingly, an advantage of the centralized orchestration system 120, is the administrator's 114 ability to implement multiple methodologies across multiple safeguard software packages 116.

As described above, it may be desirable to perform security and safeguard functions isolated from production systems. An example scenario includes testing software or data, prior to incorporation into production. In such a scenario, it is desirable to replicate all or part of an installation 102. Alternatively, a business enterprise could opt to implement a private cloud and have the replication storage local on premises. In various embodiments, commercial software, such as Actifio™, Zerto™, VMWare™, Cybric, etc., provide different ways to perform timely replication of an entire or a portion of an installation 102. A user interface in this regard is discussed later in the context of FIG. 16.

Accordingly, in various embodiments, cloud 124 may be external and/or on premises. Cloud 124, provides storage and infrastructure to host full or partial mirrors 124(a) to 124(t) of installation 102. The server side orchestration software 128 is communicatively controlled by the orchestration system 120. It provides coordination of the creation/destruction of mirrors 126, of the installation 102. The server side orchestration software 128 also provides for performing security testing and safeguarding functions on the mirrors 124(a-t).

In various embodiments, the mirror 124 may be used to perform business enterprise vulnerability testing on the mirror sequentially and asynchronously. For example, an administrator 114 may program a BRIC to perform a scan using Qualsys™ first, and thereafter may scan using BeyondTrust™.

In one embodiment, multiple mirrors 124(a-t) of the same target enterprise installation 102 may be made. Accordingly, in the above scenario, two mirrors 124 could be made, and Qualsys™ run on the first and BeyondTrust™ run on the second. Accordingly, scanning is performed synchronously and the time to perform the scans could be substantially reduced (e.g., to the time of a single scan). Synchronous scanning is described in further detail with respect to FIG. 5.

In one embodiment, an administrator 114 may create a different mirror (e.g., replica) of the target installation 102 to accommodate different methodologies (e.g., BRICs). Thus, if the an administrator 114 wished to run five different BRICs, using multiple safeguard software packages 116, that could be achieved by creating a mirror 124 for each BRIC. Accordingly, the probability of detecting threats and/or breaches improves.

In one embodiment, one or more mirrors 124(1) to **124(*t*)** may be destroyed at will. Accordingly, any security threat detected is destroyed, and data replicas will not persist thereby creating the security risk that the data replicas are breached.

As previously mentioned, mirrors 124 are isolated from the production environment. When scans are performed on production, often production performance suffers due to the computing resource load of the scan. However, since mirrors 124 are isolated from production, a scan on a mirror 124 will not affect production performance. Accordingly, it is feasible to run continuous scans without adversely impacting the business enterprise.

In one embodiment, the orchestration system 120 and by extension the server side orchestration software 128, include an analytics collector, a remediation engine, and a security reporting module. Thus, the orchestration system 120 has the ability to detect a threat 130, and to make a corresponding response 132. The orchestration system 120 and the server side software 128 are described in further detail with respect to FIG. 4.

Exemplary Hardware, Software and Communications Environment

Computing Device

Figure 2:
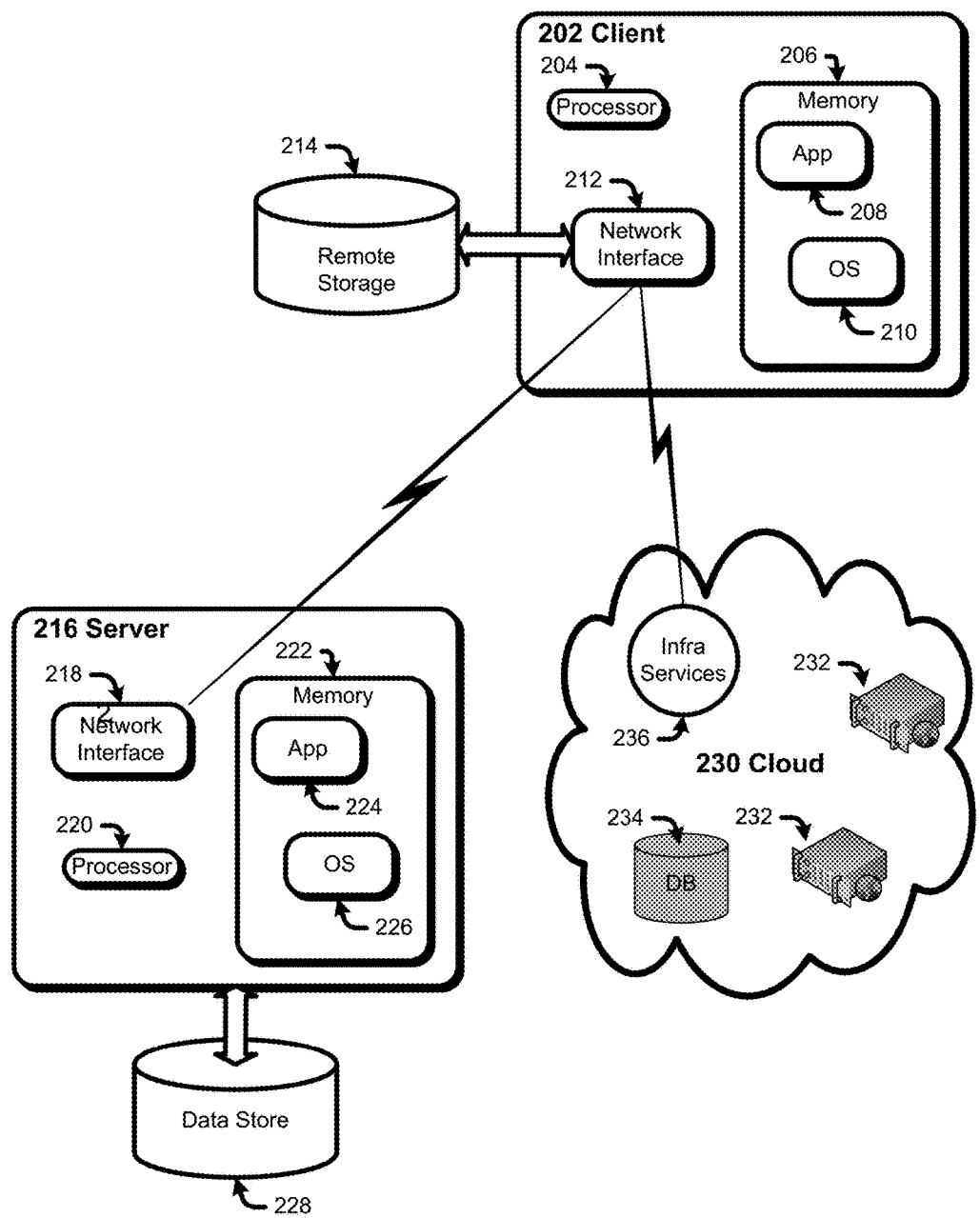
FIG. 2 illustrates an exemplary hardware, software, and communications environment that may be used to implement one or more components of the continuous delivery fabric.

Reference now is made to FIG. 2, which illustrates an exemplary hardware, software, and communications environment that may be used to implement one or more components of the continuous delivery fabric. The communications environment 200 includes a client device 202, remote storage 214, a server 216 coupled to a data store 228, and a cloud 230. Client device 202 is a computing device. Exemplary computing devices include, without limitation, a personal computer, tablet computer, smart phone, smart television, and/or smart media player.

Enterprise level security orchestration and the related continuous security delivery fabric may be used in a number of platform contexts. Although the techniques discussed herein may be brought to bear on a typical networked client device 202 accessing a remote server, the continuous security delivery fabric and related techniques alternatively may be implemented on a networked computer. Accordingly, those techniques might be performed on a client device 202 that is a personal computer or, alternatively, a portable laptop.

A client device 202 may have a processor 204 and a memory 206. Client device's 202 memory 206 is any computer-readable media that may store several software components including an application 208 and/or an operating system 210. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communication environment, user equipment device 202 may have a network interface 212. The network interface 212 may be one or more network interfaces, including Ethernet, Wi-Fi, or any number of other physical and data link standard interfaces. In one embodiment, (e.g., where the user performs operations on a stand-alone single machine), the network interface 212 is optional.

Client-Server/Multi-Tier

Client 202 may communicate with a server 216. Server 216 may be any computing device that may participate in communication via a network. The network may be, without limitation, a local area network ("LAN"), a virtual private network ("VPN"), a cellular network, or the Internet. The client network interface 212 may connect with remote networked storage 214, and/or to server 216 via server network interface 218. Server network interface 218 may be one or more network interfaces, similar to that of client network interface 212 discussed above. Server 216 also has a processor 220 and memory 222. The memory 222 may be any computer-readable media including both computer storage media and communication media. In particular, memory 222 stores software that may include an application 224 and/or an operating system 226. Memory 218 may also store applications 224 that may include, without limitation, an application server and a database management system. Accordingly, client device 202 may be configured with an application server and data management system to support a multi-tier configuration.

Server 216 may include a data store 228 accessed by the data management system. The data store 228 may be configured as a relational database, an object-oriented database, a NoSQL database, and/or a columnar database, or any configuration to support scalable persistence. In various embodiments, the server 216 need not be on site or operated by the client enterprise. For example, the server 216 may be hosted in the Internet on a cloud installation 230. The cloud installation 230 may represent a plurality of disaggregated servers which provide virtual web application server 232 functionality and virtual database 234 functionality. Cloud 230 functionality 232, 234 may be made accessible via cloud infrastructure 236. In various embodiments, cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Orchestration Software

Figure 3:
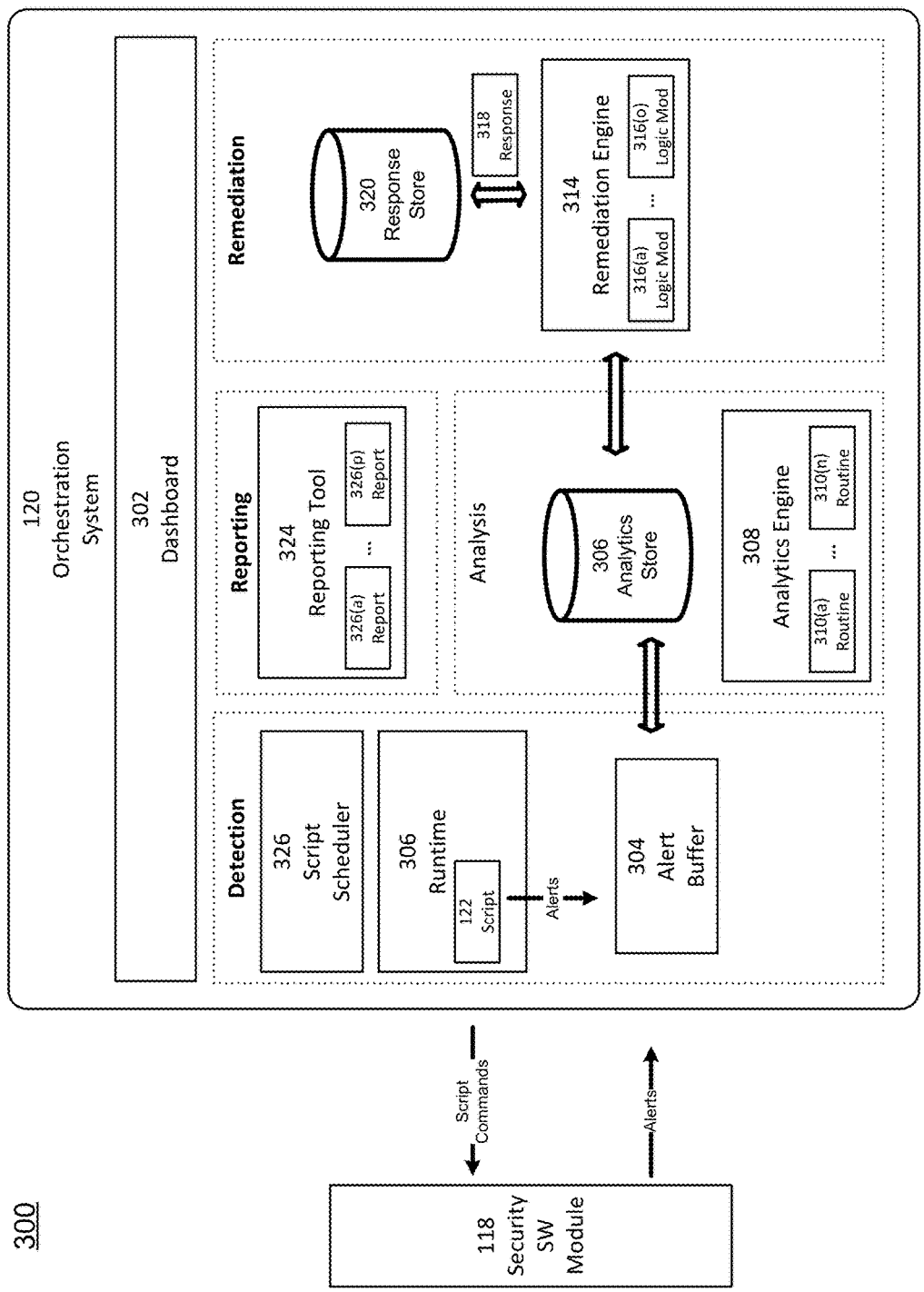
FIG. 3 illustrates an example block diagram for enterprise level security orchestration.

FIG. 3 is an example block diagram 300 of an orchestration system 120 and the server side orchestration software 128. The orchestration system 120 includes a dashboard 302 that provides an integrated view of the security status of the installation 102. It may show scans in progress, status of scans present and historical, reports and recommendations, and it may show present alerts. Accordingly, there are at least three types of notifications: (1) alerts from individual software packages 116, (2) alerts from scans in progress as orchestrated via BRICs 122, and (3) surfaced recommendations not specific to a scan. The dashboard 302 will be discussed in more detail in a later section.

In one embodiment, to receive alerts from individual safeguard software packages 116, a safeguard software package 116 sends an alert, which is intercepted by a safeguard software module 118. The safeguard software module 118 then adds metadata identifying the safeguard software package 116 and itself (i.e., the safeguard software module 118), and then forwards the alert and metadata directly to alert buffer 304. The dashboard 302, will then receive a notification that a new alert has been received in buffer 304 and will update the dashboard user interface 302 accordingly.

In one embodiment, to receive alerts from software packages 116(a) to 116(r) (representing various security software tools), a runtime 306 executes a BRIC 122. The BRIC 122 will then receive alerts from safeguard software packages 116, as forwarded by the safeguard software modules 118. Alternatively, the BRIC 122 may create an alert of its own. The runtime 306 will then add metadata identifying the BRIC 122, the mirror instance 128, the safeguard software package 116 and the safeguard software module 118 that provided the alert. Both types of alerts are then forwarded by the runtime to the alert buffer 304. The dashboard 302 updates upon receiving a notification from the alert buffer 304, as described above.

Upon triggering events or at predetermined intervals, the alert buffer 304 populates an analytics data store 306. An analytics engine 308 will then run analytics routines 310(a) through 310(n) at predetermined intervals upon a triggering event to identify data security threats. When a threat 312 is detected, the analytics engine 308 creates a record and stores the same in the analytics store 306.

A remediation engine 314 is configured to monitor the analytics store 306 and detect threat patterns. The detection may be through any number of remediation logic modules 316(a) through 316(o). A remediation logic module 316 may be a hardcoded script from an administrator 114. For example, the remediation logic module 316 may simply state that where unauthorized access is via an open port, the module 316 is to close the port and trigger a report. A remediation logic module 316 may use a similarity measure. For example, based on past behavior patterns, the administrator may close an open port upon learning of an unauthorized access. The logic module 316 then closes all unused open ports proactively to prevent an additional breach. A remediation logic module 316 may be a module that implements any number of known machine learning algorithms to learn threats and to suggest responses 318. Responses 318 that are repeatedly accepted or used by the administrator are stored in response data store 320.

A reporting tool 322 creates reports 326(a) through 324(p) based on the records of the analytics store 306. These reports are provided on the dashboard 302. In some cases, the reporting tool 322 make be invoked by the remediation engine 314 to surface recommended responses as recommendations.

Both threat data (as stored in the analytics store 306), and potential responses (as stored in the response data store 320), need not be populated solely from scans of the installation. Third party data from the security community can also be loaded via the dashboard 302, thereby adding to the capabilities of the orchestration system 120. In general, the orchestration system 120 may aggregate data.

In one embodiment, a scheduler 326 may be used to schedule the execution of one or more BRICs. Each BRIC may be performed synchronously or asynchronously. Synchronous scheduling is described in further detail with respect to FIG. 5.

In one embodiment, the foregoing infrastructure may be implemented via a microservices architecture. Specifically, all or some of the facilities comprising the workflow of the orchestration system 120, such as the scheduler 326, analytics engine 308, reporting 324, and remediation engine 314 may be implemented as a lightweight process that communicates with other processes via a message bus. As a result, facilities implemented as microservices are loosely coupled lending themselves for frequent and fast upgrade and replacement. This lowers cost of maintenance, and enables quick fixes if needed.

Artificial Intelligence/Machine Learning

In one embodiment, the remediation engine 314 uses artificial intelligence and/or machine learning. For example, since multiple scanning tools may be used, the technology discussed herein has an ability to establish an inventory of the environment (servers/applications) with a common vulnerabilities and exposures (CVE) database. The system can match a server's characteristics to the CVE and alert the Incident Response team and/or spin up a BRIC to provide performance metrics. Accordingly, the technology of the remediation engine has the ability to be proactive and manage workflow for the business enterprise. To that end, machine learning may be used.

Machine learning is a subfield of computer science that evolved from the study of pattern recognition and computational learning theory inartificial intelligence. Machine learning is used herein to construct algorithms that can learn from and make predictions based on the data stored in the data store. Such algorithms operate by building a model from stored prior inputs or baselines therefrom in order to make data-driven predictions or decisions (OR to provide threshold conditions to indicate a malfunction), rather than following strictly static criteria.

Based on the machine learning, patterns and trends are identified, and any outliers identified as a malfunction.

In various embodiments, the machine learning discussed herein may be supervised or unsupervised. In supervised learning, the monitoring server may be presented with example data from the data store as being acceptable. Put differently, the data store acts as a teacher for the monitoring server. In unsupervised learning, the data store does not provide any labels as what is acceptable, rather, it simply provides historic data to the monitoring server that can be used together with the recently harvested data from the system to find its own structure among the data.

In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

Example Life Cycle of Enterprise Level Security Orchestration

Figure 4:
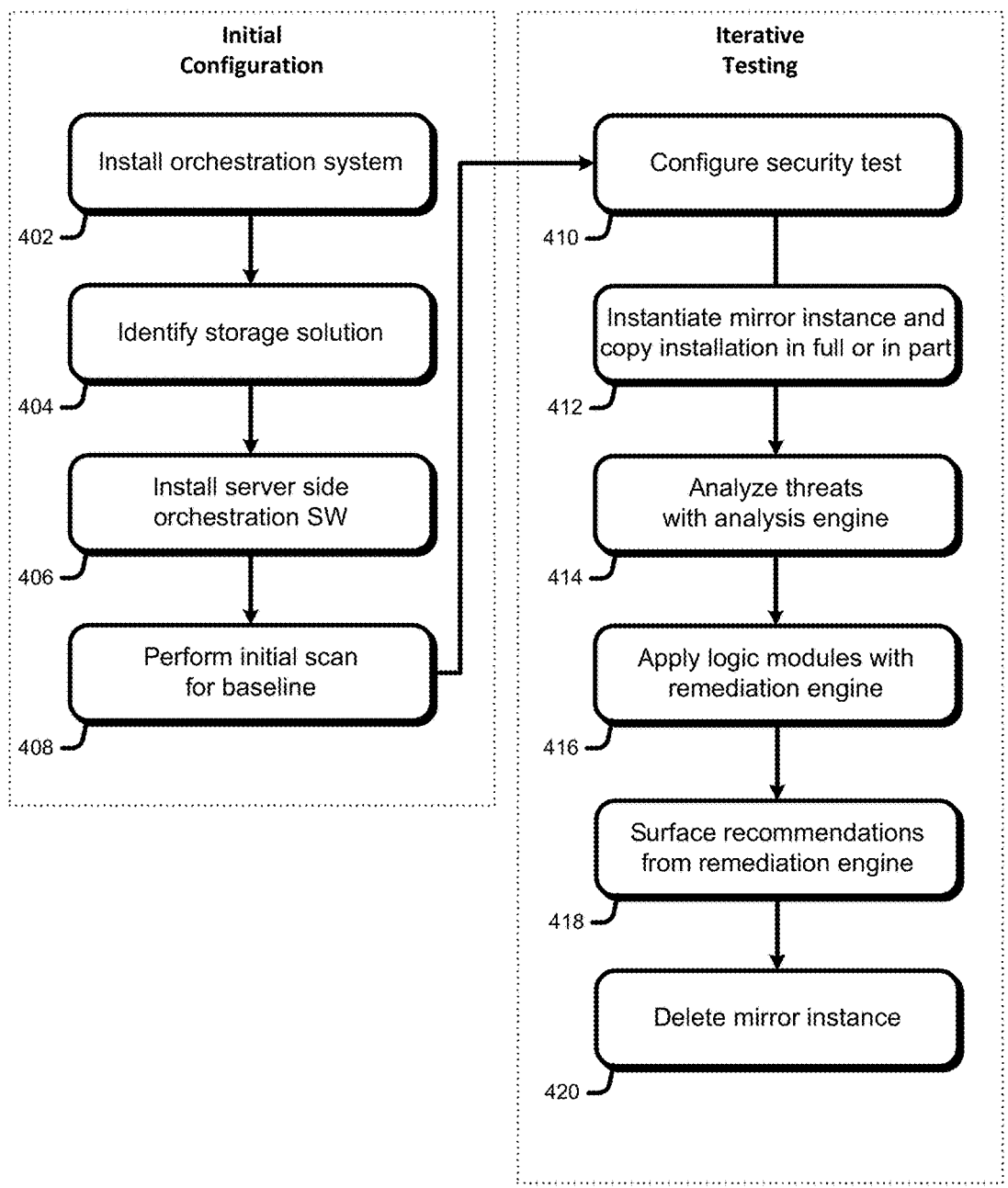
FIG. 4 illustrates an example life cycle performing enterprise level security orchestration.

FIG. 4 illustrates an example flow 400 of a life cycle of enterprise level security orchestration, starting with an initial deployment. After the deployment, illustration 400 shows an exemplary continuing operation for enterprise level security orchestration.

At block 402, the orchestration system 120 is installed. This includes installing the safeguard software modules 118.

Specifically, for every safeguard software package 116 installed, a corresponding safeguard software module 118 is installed and configured to interface the safeguard software package 116 to the orchestration software.

At block 404, a storage solution is identified. Generally an external cloud storage solution is identified. Alternatively, a private cloud could also be implemented. In yet other embodiments, standard networked storage on a local area network may be chosen as well. Thus storage could be either external, or on premises.

At block 406, the server side orchestration software 128 is installed. Where an external cloud has been chosen at block 404, the server side orchestration software 128 will be configured to create one or more mirrors of the installation 102 on demand. Where a local storage has been chosen, the server side orchestration software 128 will be configured to allow the safeguard software packages 116 to operate directly on mirrored data.

At block 408, an initial scan may be performed. The installation's configuration along with the initial scan thereby provide a data baseline for the security state of the installation 102. At this point, the orchestration system 120 is ready for operations.

At block 410, the orchestration system 120 may be configured by an administrator 114 to run a particular security test, to perform continuous scanning, or to execute a BRIC 122. The orchestration system 120 then performs the request as scheduled. Generally, the request is performed on a mirror.

At block 412, upon demand by the orchestration system 120, an installation 102 may be mirrored in full or in part. The mirror 124 generally includes at least one application (e.g., as it would be installed in production) and a snapshot of the application's data. In the case of external cloud, copies of the safeguard software packages 116 and their respective safeguard software modules 118 are also installed.

It should be noted that since the safeguard software packages 116(a) to 116(r) are also mirrored at block 412, versioning of the safeguard software packages 116(a) to 116(r) need not be tracked. Rather, the administrator 114 may indicate that the safeguard software modules 118 match the safeguard software packages 118 and are properly configured prior to mirroring.

Generally, replicating installations 102 is a time consuming process. However, commercial software, such as Actifio™, Zerto™, VMWare™, and/or Cybric may be used to create mirrors in a timely fashion. In one embodiment, orchestration of replication is performed by the server side orchestration software 128.

At block 410, during the performance of the security tests, threats and alerts are detected by the security software packages 116, as orchestrated by BRICs 122. The threats and/or alerts are then stored in the alert buffer 304 where alerts that are threats 312 are stored in an alert data store 306.

At block 414, an analytics engine 308 analyzes the threats 312 in the alert data store 306 to detect threat patterns. Upon detection of threat patterns, at block 416, a remediation engine 314 is engaged. The remediation engine 314 employs a number of remediation logic modules 316 to identify potential responses 318. At block 418, responses 318 are surfaced as recommendations to the dashboard 302. In embodiments, responses 318 are automatically executed.

Note that reporting can be done in conjunction with past scans. For example, a second scan could be compared to the initial scan performed at block 408. Instead of surfacing all issues, only new issues could be surfaced by removing all issues identified in the initial scan. Accordingly, a "delta report" could be generated to be displayed on the user interface dashboard 302.

At block 420, the mirror instance 128 may then be deleted. Accordingly, the mirror instance would not pose a security risk where data could be exposed. At this point, operation can return back to block 412 to perform another scheduled test.

Synchronous Scanning

FIG. 4 was described above in the context of sequentially and asynchronously. However, testing may be performed synchronously. Since multiple mirrors 124 may be instantiated in storage, different tests may be performed in parallel. More particularly, because different safeguard software packages 116 operate on an entire mirror, running two or more packages in parallel on the same mirror at the same time would likely create race conditions. By running the two safeguard software packages 116 each on their own respective mirror 124, race conditions are avoided.

Figure 5:
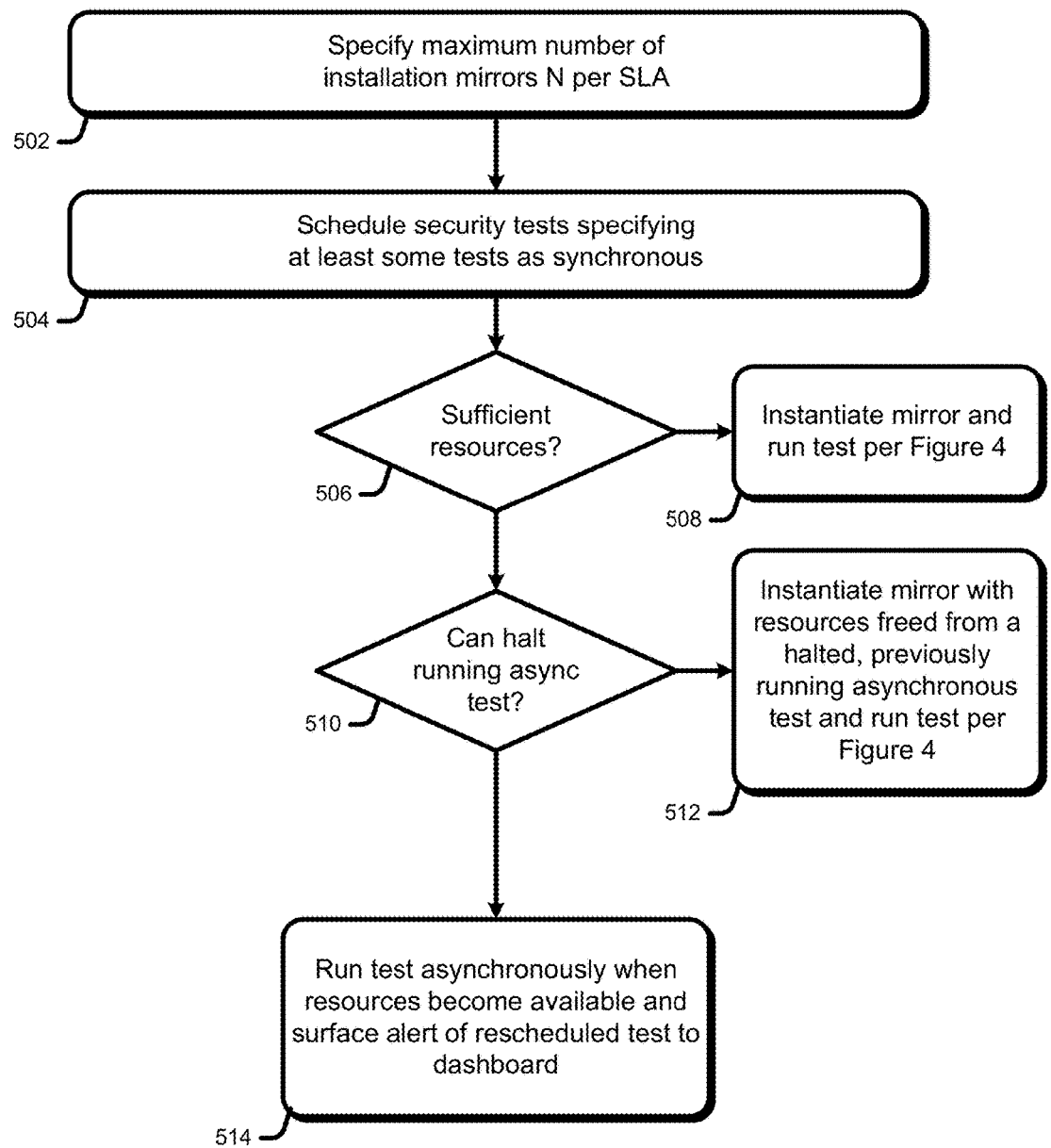
FIG. 5 is an example flow chart for synchronous mirroring for enterprise level security orchestration.

To perform synchronous scanning, tests may be scheduled synchronously. The scheduling functionality is largely performed by the scheduler 326 in the orchestration system 120. FIG. 5 is a flow chart 500 describing synchronous scanning.

At block 502, an administrator 114 specifies the maximum number of mirrors N that are covered by a service level agreement (SLA) with the cloud provider of cloud 124. While theoretically, the cloud 124 could run an unlimited number of mirrors, the administrator 114 will have a limit N based on cost.

At block 504, the administrator 114 schedules security tests. Tests may be marked as synchronous. Alternatively, multiple tests could be scheduled to run at the same time, in which case the scheduler 326 for a BRIC assumes that the tests are to be run synchronously.

At block 506, if a test is scheduled at the present time, the scheduler 326 checks to see if there is sufficient capacity to create a mirror. If there is, at block 508, the mirror is instantiated, and the test is run as per FIG. 4. If there is insufficient capacity, the scheduler 326 checks to see if there is a currently running asynchronous test 510. If there is, then (i.e., at block 512), the currently running asynchronous test is halted, a new mirror is instantiated using the newly freed resources, and the test is run as per FIG. 4. If no currently running asynchronous test can be identified, then (i.e., at block 514) the scheduler 326 schedules test run asynchronously and an alert is surfaced to the dashboard. The scheduler can be set with options where a test that cannot be run synchronously is simply not run.

Security Policies as Reusable Components for Operational Efficiency

In one aspect, the foundation of the Continuous Security Delivery Fabric ("CSDF") discussed herein is the concept of a componentized security policy, also known commercially as a "BRIC". Componentized security policies are comprehensive security templates that define IP-based targets, security services and tools to run on defined schedules, and actions to take for remediation of a particular exploit or vulnerability.

A componentized security policy encapsulates a number of different security functions that constitute the performance of a security policy. A security function can be manifested in the execution of a security tool or utility, such as scanning software. The security functions may include scans at all points of time during application development. At development time there may be a development security operations policy to ensure that development environments are free of non-secure tools. A code scan policy may check for non-secure artifacts such as Easter Eggs and stack overrun vulnerabilities by performing static analysis. After deployment, an application scan policy may check for corrupt files or potential Trojan horse threats.

One aspect of a componentized security policy is that because it is encapsulated, it can be used, transferred and modified as an atomic unit. It aids in orchestration as one or more componentized security policies may be invoked and scheduled, as to be used in conjunction with each other. Specifically, multiple componentized security policies may be scheduled as not to interfere with each other, and the aggregated results (including reporting and telemetry during scanning) may be collected and reported together. Multiple componentized security policies may be run sequentially as a workflow to perform a task larger than a single componentized security policy. Alternatively, multiple componentized security policies may be run in parallel and the results combined to provide broader coverage.

In one embodiment, the role of a CSDF is to ideally schedule multiple componentized security policies such that at least one componentized security policy is executing a security function against a shadow environment substantively continuously. The aggregated results from multiple componentized security policies may be analyzed to infer issues in an information technology installation based on the results on tests against the shadow environment.

Figure 6:
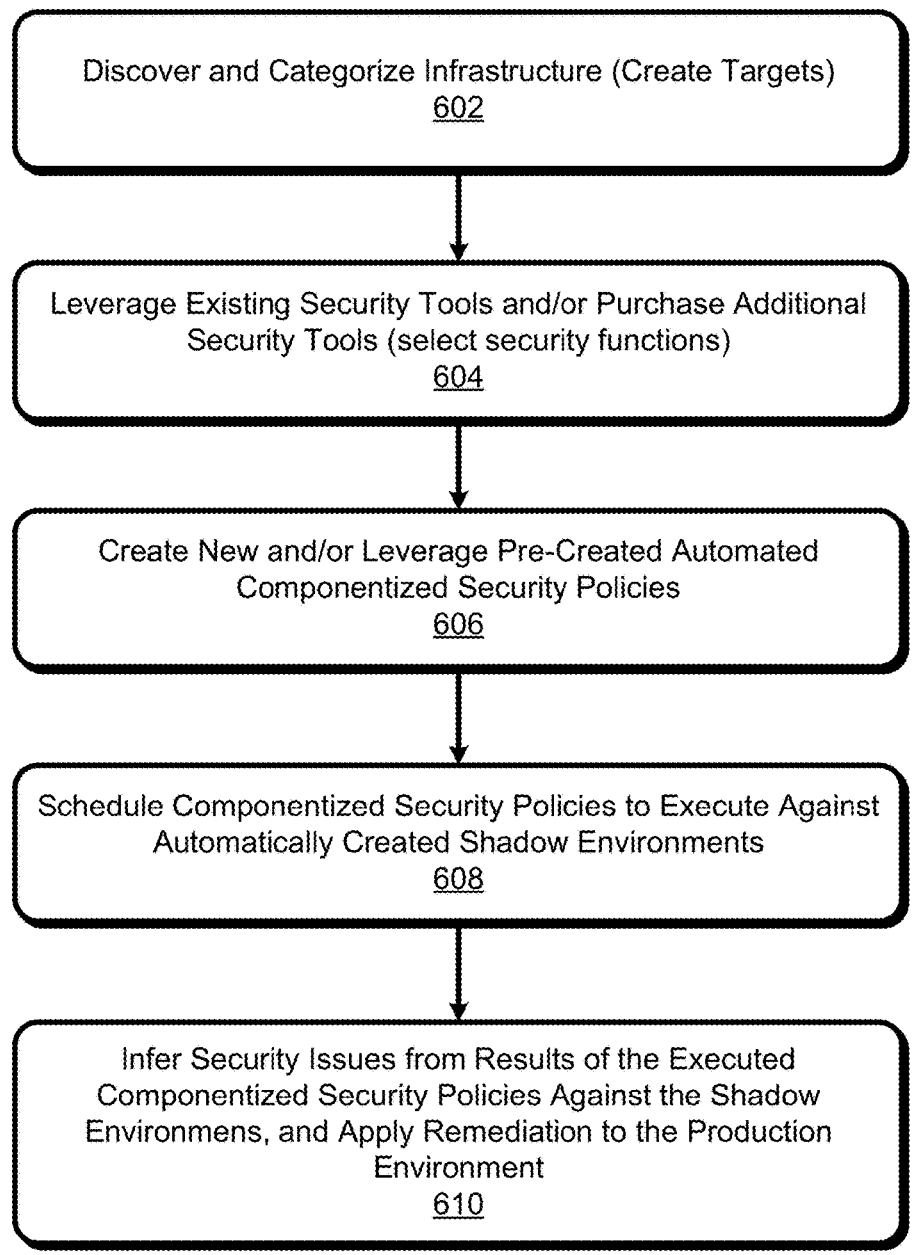
FIG. 6 illustrates an example process flow for the continuous security delivery fabric via a componentized security policy (also known as a "BRIC").

FIG. 6 illustrates an example process flow 600 for componentized security policies via the CSDF.

As indicated by block 602, an integration workflow may start with defining the targets and target groups, including physical and virtual servers and applications. An administrator 114 may prepare a target list comprising a list of items, such as servers and applications, that the administrator 114 wishes to apply security policies to.

At block 604, the administrator 114 chooses which of its existing security tools to leverage, plus any additional software or web-based security services to purchase that are to perform desired security functions on items in the target list. The security tools and/or service comprise the physical means by which one or more policies are to be implemented.

At block 606, the organization then creates a new componentized security policy by encapsulating specific security functions. The specific security functions are invocations to execute the one or more security tools, usually in the form of a script 122. The componentized security policies, one created may be stored, and selected for future use.

Once the componentized security policies are selected, at block 608, shadow containers of the production environments are created, and all security functions are scheduled for execution across multiple containers, removing the risk and performance impact to the production environment. Depending on the intent of the administrator 114, the componentized security policies may be executed either in parallel or serially or in some combination of the two.

As previously stated, the CSDF greatly simplifies the scheduling of workflow, as multiple componentized security policies may be run a plurality of time scheduled around the clock, running the majority of the time, or even substantively continuously with a minimum of downtime. Because one or more containers may be instantiated, security functions of the componentized security policies may run in parallel without interfering with each other.

Finally, at block 610, remediated changes identified and are applied to the production environment via integration with the applicable automation tools, effectively closing the exploit window and any potential vulnerabilities.

Note that with multiple componentize security policies running continuously, there is a substantial amount of results data that may be collected and aggregated, potentially in analytics store 306. Machine learning algorithms may be applied to the results data, into clusters which can constitute a signature for a potential threat or vulnerability. Where results data aggregate in such cluster, the analytics engine 308 may infer the statistical likelihood of the existence of that potential threat or vulnerability. The remediation engine 314 may then be invoked to select a potential remediation response 318 from the response store 320.

The remediation response 318 may run executed automatically. Alternatively, the administrator 114 may be prompted as whether to execute the remediation response 318 or not. Note that the decisions of the administrator (e.g., a selection yes to run, or no not to run) may be store in a selection data store. This data may itself be subjected to a machine learning algorithm to determine how often selections were effective, and to change the likelihood that the remediation engine 314 proffers a particular remediation response 318 in the future.

Dashboard Interface

As discussed above, in one aspect, the CSDF discussed herein virtualizes security vulnerability scanning and remediation (including automation and orchestration) with a management interface, referred to herein as the dashboard interface, which includes several pages. Such orchestrated approach to security vulnerability substantially reduces the time to identify and fix vulnerabilities, and may free up engineers from chasing threats. The security delivery fabric integrates with existing vulnerability scanning tools, sometimes referred to herein as safeguard software packages, (or replaces them with open-source tools) through the creation of policy-based security elements, referred to herein as BRICs. These BRICs can be applied dynamically and scheduled to run with any production environment as the source, on-premises, or in the cloud.

Figure 7:
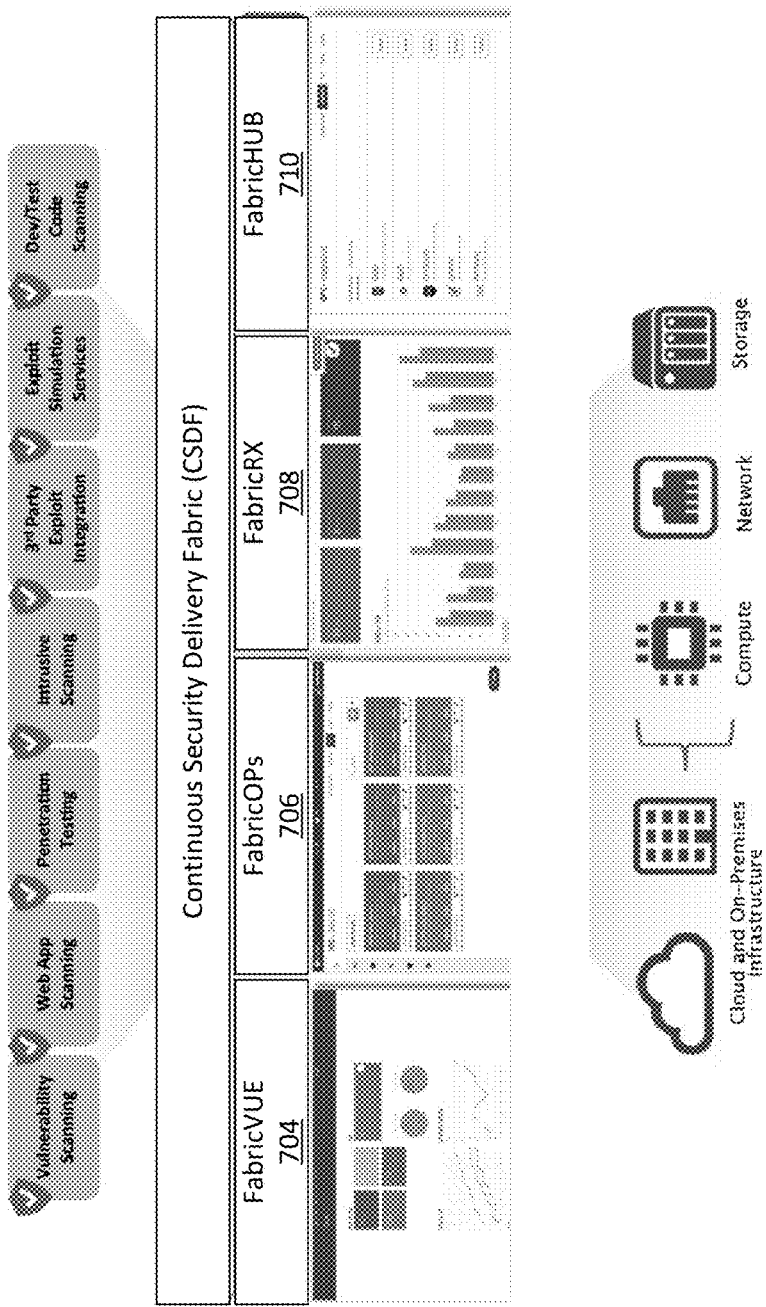
FIG. 7 illustrates an example dashboard that provides an overview of the continuous security delivery fabric.

FIG. 7 illustrates a dashboard 700 that provides an overview of the CSDF. The functionality provided via the dashboard includes, without limitation, vulnerability scanning, web-app scanning, penetration testing, intrusive scanning, third party exploit integration, exploit simulation services and device/test code scanning. The four core components of the continuous security delivery fabric provided on the dashboard 700 include FabricVUE 704, FabricOPs 706, FabricRX 708 and FabricHUB 710. Each one of these modules is discussed in further detail below.

Module FabricVUE 704 is a reporting and compliance engine. Module FabricVUE 704 is a single, intelligent view of an organization's entire security operation, including organization-wide and BRIC-centric dashboards showing key performance indicator (KPI) benchmarking and service level agreement (SLA) compliance, for actionable intelligence.

Module FabricOPS 706 is an orchestration engine. For example, FabricOps 706 enables organizations (e.g., business enterprises) create and automate policy BRICs (e.g., security workflows that run against an encrypted virtual copy of the application stack constituting the underlying software infrastructure for an organizations installation. Such near real-time security scanning enables simple, efficient risk reduction. In one aspect, instead of running a BRIC against the actual production infrastructure (which may impact performance), the security fabric uses the FabricOPS 706 orchestration capability to automatically create a virtual copy of the environment against which to execute controls. This enables near real-time scanning with no production impact.

Module FabricRX 708 is a remediation integration engine. In one embodiment, it provides a nearly instant fix through auto-remediation technology. By integrating with open source and commercial security tools, module FabricRX 708 identifies fixes that can be automatically used to remediate cyber vulnerabilities discovered through Fabric OPS, based on the BRIC policies and machine learning.

Module FabricHUB 710 is a developer-defined security integration engine. It integrates security scanning and remediation directly into a software development process. In one embodiment, by using an API (e.g., Cybric API), block fabricHUB 710 integrates into existing continuous development and delivery workflows, allowing business enterprises build more secure applications faster.

In one embodiment, there is an additional (optional) module FabricSRV engine (not shown in FIG. 7) that is configured to provide machine-based intelligence.

Various Aspects of the Dashboard Interface

The management interface provided by the dashboard of the CDSF discussed herein makes it easy to deploy and manage an automated security environment. In one example, in less than a minute and with a few clicks and/or entries, a system administrator of a business enterprise can follow a security wizard in the form of a dashboard that can be used to set up a new fabric of a business enterprise by providing account information and then selecting the subscription, initial BRIC templates, a copy data management (CDM) provider, and the security tools that are to be leveraged.

Then, using the simple and intuitive graphical interface provided by a dashboard having several pages (or sub-dashboards), nearly every task associated with managing and monitoring an entire simulated business enterprise security environment. An administrator can switch between the FabricVUE 704, FabricOPS 706, FabricRX 708, and FabricHUB 710 modules within the same interface by simply selecting the appropriate modules from a drop-down window or by clicking an appropriate icon at the dashboard 700.

FabricVUE Dashboard

Figure 8A:
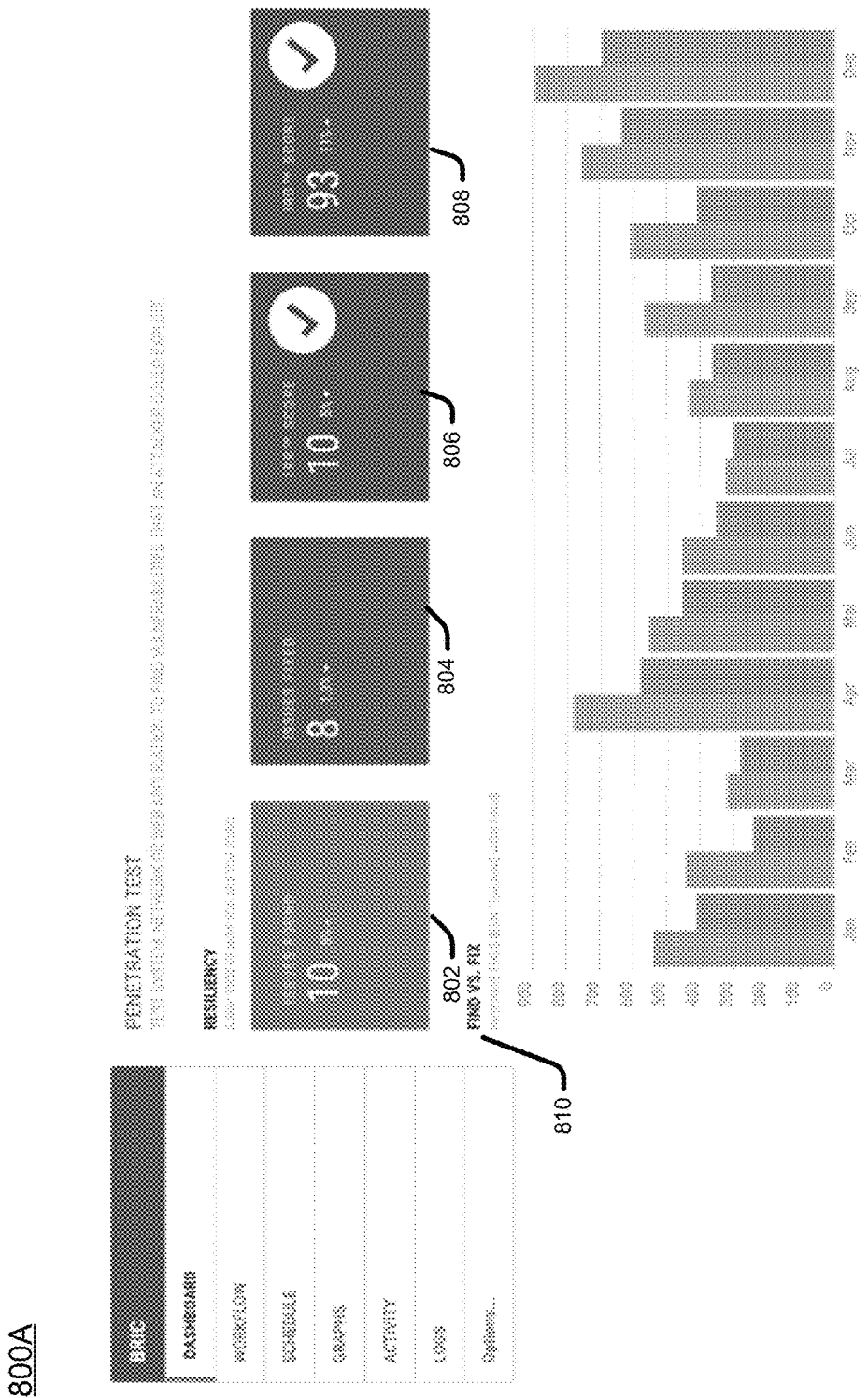
FIGS. 8A and 8B illustrate example dashboards that display the security posture and key performance indicators in a single interface.
Figure 8B:

For example, using the FabricVUE module 704, an administrator can gain insight into the entire security environment with an easy-to-read dashboard 800, as illustrated in FIGS. 8A and 8B. Thus, the dashboard 800A of the FabricVUE module displays a security posture and the key performance indicators (KPIs) in a single interface. In one embodiment, the dashboard 800B provides a "Risk Vector" for the entire environment that categorizes potential predetermined vulnerabilities and their respective predetermined risk levels into high 814, medium 816, or low 818 levels of risk. The dashboard 800B may also list the top priority issues, number of issues found, and the number of issues fixed, and summarize these results into easy-to-read graphs and scores. In one embodiment, the dashboard 800A/B illustrates the top issues that have been found by severity, in the form of a list (not shown). Billing information may also be provided, wherein the billing information may be based on the number of compute hours that a BRIC has used.

For example, the dashboard 800A may provide a historic overview of the status of the security target as determined by one or more BRICs. To that end, the dashboard 800 may include several display blocks, such as issues found 802, issues fixed 804, internal rate of remediation (IRR) score block 806, and internal rate of detection (IRD) score block 808.

The issues found block 802 relates to the threats and/or malfunctions identified by the one or more BRICs in a predetermined time period (e.g., month). In the example of FIG. 8A, ten vulnerability issues are identified. In one embodiment, the issues found block 802 may also indicate trend information, such as whether the present number of issues identified represents an increase (e.g., up arrow) or decrease (e.g., down arrow) in percentage with respect to a prior time period. In the example of FIG. 8A, there is an increase of 5% of security vulnerability issues found with respect to a prior predetermined period (e.g., prior month).

In the example of FIG. 8A, the issues fixed block 804 indicates that eight of those ten issues of the "issues found" block 802, were fixed. The issues fixed block 804 may also indicate trend information regarding the percentage of issues fixed as compared to the prior time period (e.g., month). It will be understood that the number of issues fixed does not exceed the number of issues found.

The IRR block 806 relates to the efficiency in which vulnerability issues that are found are resolved. Some security issues are more difficult to remedy than others. Indeed, the remedy for some identified security issues may involve manual intervention from an information technology (IT) specialist, while other issues can be resolved automatically in near real-time. For example, some fixes may be as simple as closing a communication port or deleting some data that has been identified to pose a vulnerability threat. Other fixes may involve time consuming human intervention or machine learning to identify complex intricate problems. In this regard, the IRR score block 806 represents how fast the issue was resolved upon identification of the security issue. In one case an IRR may be calculated as a rolling average of the percentage of issues remediated within a rolling predetermined time frame. The higher the number, the faster the resolution, where, in one embodiment, 100 represents the highest IRR score possible and 0 the lowest. In one embodiment, if the IRR is below a predetermined threshold (e.g., 50) it may indicate that the efficiency in the resolution of the identified vulnerabilities may need improvement.

In one embodiment, the IRR score block 806 may also indicate trend information, such as whether the present IRR score is an increase (e.g., up arrow) or decrease (e.g., down arrow) in percentage with respect to a prior time period.

The IRD block 808 relates to the efficiency at which vulnerability issues are detected. Some vulnerability issues may take longer to detect than others. For example, a BRIC may specify that a particular scan should be run once a quarter while another scan may be performed immediately upon data being received. The longer it takes to identify a vulnerability issue, the lower the IRD score. In one embodiment, the highest possible IRD score is 100 and the lowest is 0. In one embodiment, if the IRR is below a predetermined threshold (e.g., 70%) it may be indicative that the efficiency in the determination of the vulnerability may need improvement.

Similar to the IRR score block 806, the IRD score block 808 may also indicate trend information, such as whether the present IRD score is an increase (e.g., up arrow) or decrease (e.g., down arrow) in percentage with respect to a prior time period.

The dashboard 800A/B may also provide a bar graph view of the number of issues found to the number of issues fixed over time. By way of example, dashboard 800A illustrates that in January, approximately 500 issues were identified. From those, 400 were fixed.

FabricOPs Dashboard

By virtue of the policy-based BRICS discussed herein, a business enterprise gains more flexibility in controlling the security delivery fabric by removing the dependence on the production environment. BRICS can be readily created and run against one or more shadow environments to evaluate and compare the effectiveness of commercial and (e.g., open sourced) security products and services, perform penetration testing, test patches and potential fixes, etc., without impacting the production environment or placing it at risk. These shadow environments are provisioned on demand and include the resources used by the task. BRICS can accommodate elastic infrastructures, such as public infrastructure or platform-as-a-service (PAAS) solutions that can automate the compute and storage provisioning.

Figure 9:
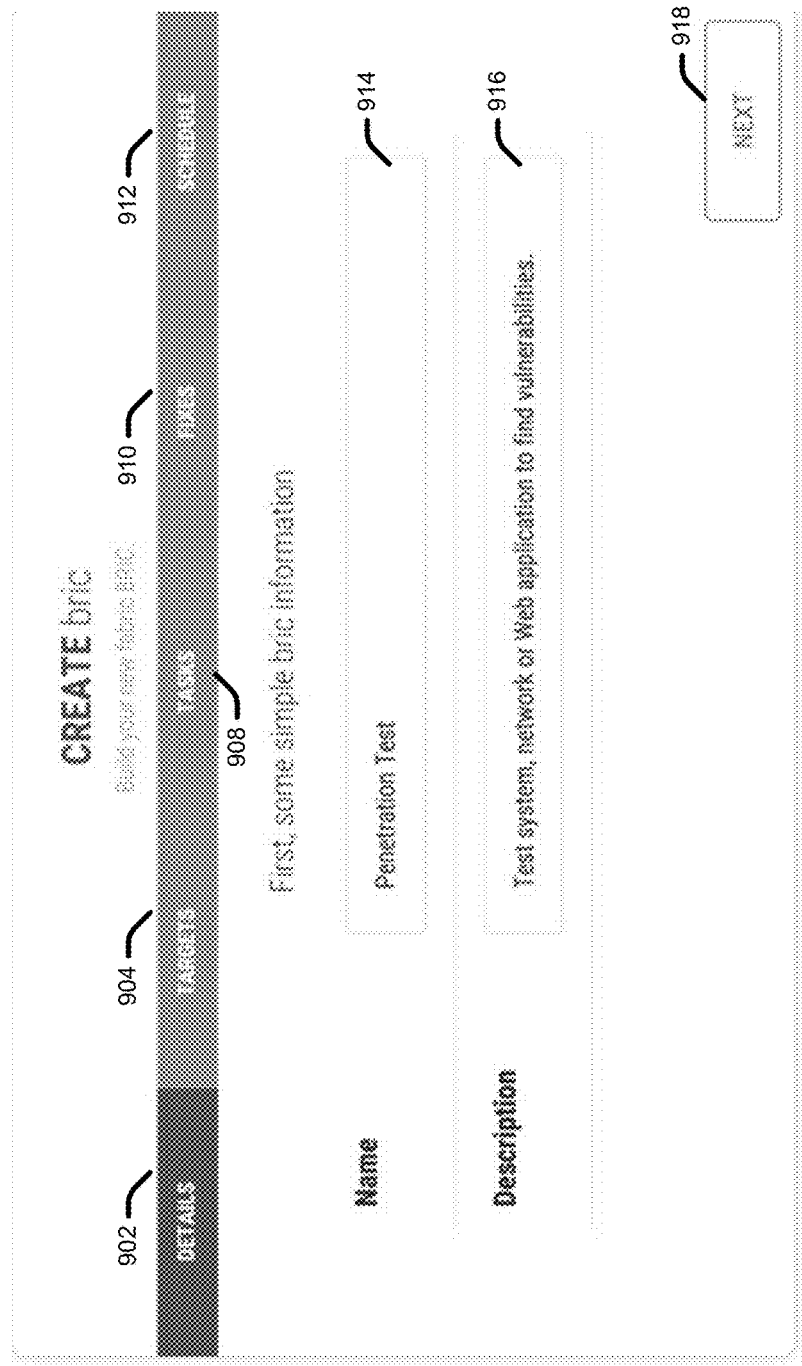
FIG. 9 illustrates an example dashboard that is used to capture preliminary details of the BRIC to be created for a business enterprise.

FabricOPS can be used to create and/or modify BRICs. FIG. 9 illustrates a user interface in the form of a dashboard 900 to capture preliminary details of the BRIC to be created for a business enterprise. The heading portion illustrates that the data entry to the wizard may be divided into different sections, such as a details block 902, targets block 904, tasks block 908, fixes block 910, and schedule block 912. The details page of the dashboard 900 provides a field 914 to provide a name for the penetration test and a field 916 for the description of the test. The targets page 904 page of the dashboard 900 may be invoked by selecting the next 918 icon or by selecting the targets icon 904 directly.

Figure 10:
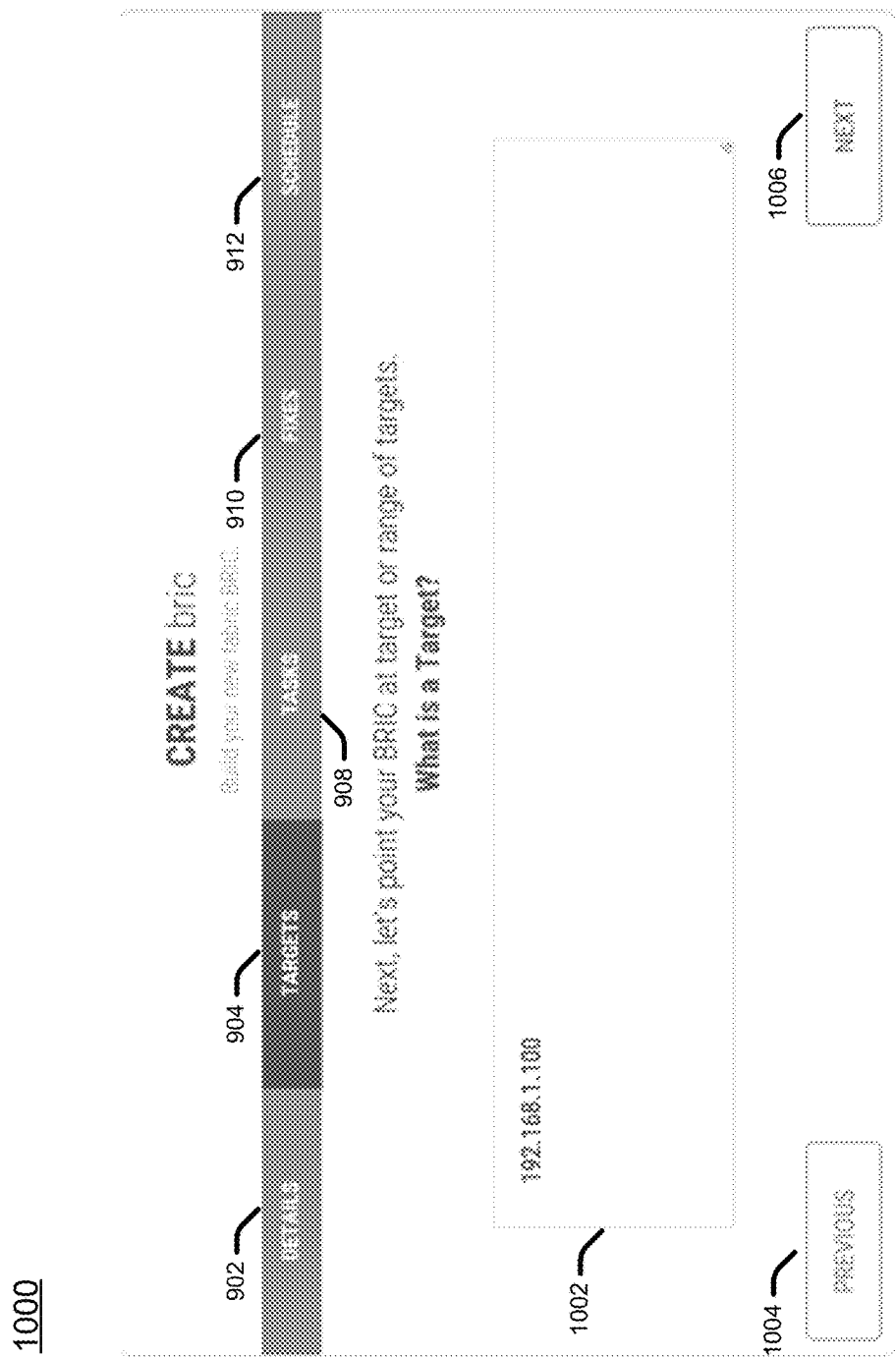
FIG. 10 illustrates an example dashboard used to receive target information.

FIG. 10 illustrates a user interface in the form of a dashboard 1000 to receive target information. The target 1002 is the business enterprise asset that is being protected. For example, the target 1002 may be provided in the form of an IP address, a URL, a server name, an application, etc. Thus, each BRIC includes information on the target(s) against which a prescribed set of security services is to be run. In various embodiments, these targets could be chosen to focus security operations on particular environments, workloads, or applications by simply providing IP addresses or an entire sub-net. An administrator may go on the tasks block 908 by selecting the next icon 1006, or return to the details block 902 by selecting the previous icon 1004. In one embodiment, an administrator using the dashboard may skip to any section by selecting the appropriate block on the dashboard 1000.

Figure 11:
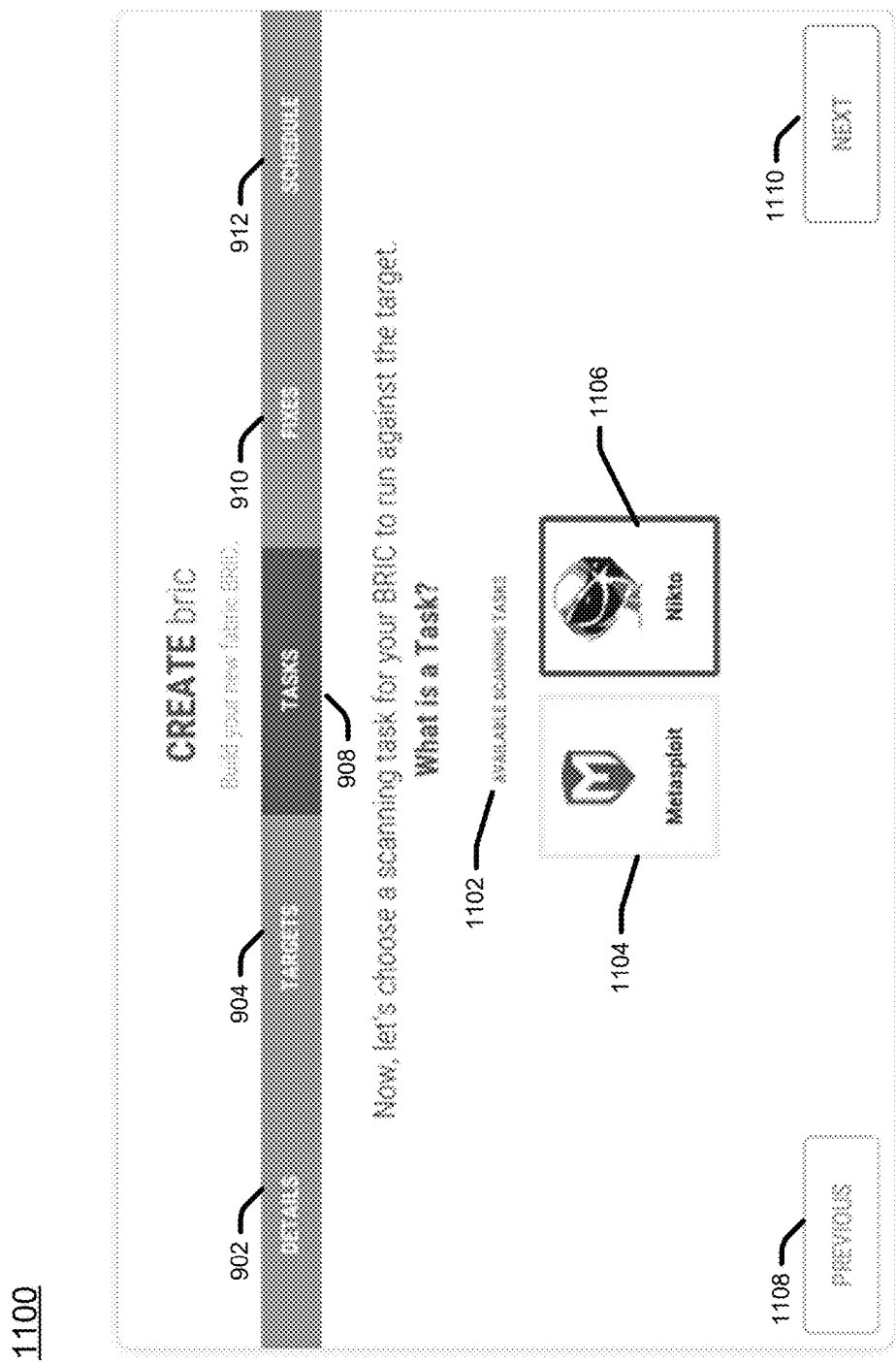
FIG. 11 illustrates an example dashboard used to receive task information.

FIG. 11 illustrates a user interface in the form of a dashboard 1100 to receive task information. In particular, the dashboard 1100 displays the available scanning tasks 1102, which may include various safeguard software packages that are commercially available. Put differently, the administrator can select one or more scanning tasks for the BRIC to run against the target to be protected. To that end, different types of safeguard software packages may be provided. By way of example, dashboard 1100 includes Metasploit 1104 and Nikto 1106 as possible security scanners, while it will be understood that other safeguard software packages may be used as well.

Nikto is an open source general public license web server scanner that performs tests against web servers for the target. Metasploit provides insight about security vulnerabilities and assists in penetration testing and the intrusion detection system (IDS) signature development. Metasploit and Nikto are included in FIG. 11 by way of example only and not limitation.

In one embodiment, FabricOPs, which is the tool for the BRIC, determines what security packages would be appropriate based on the information provided (infrastructure) so far. Thus, even if there may be many (e.g., dozens) of safeguard software packages available, the dashboard interface 1100 provides an initial filtration to provide only the relevant tools for the particular client. Such approach prevents clutter on the dashboard and expedites the selection process for the administrator. In various embodiments, the preliminary filtration may be based on the safeguard software packages (e.g., 116(a) to 116(r)) available for the business enterprise and the type of target selected in a prior step.

An administrator may go on the fixes block 910 by selecting the next icon 1110, or return to the targets block 904 by selecting the previous icon 1108. In one embodiment, an administrator using the dashboard may skip to any section by selecting the appropriate block on the dashboard 1100.

FabricRX Dashboard

BRICs include the specific security tasks that are to be orchestrated against the shadow targets, as well as the alerts, workflows, and remediation steps that would be taken through FabricRX if a particular task were to find an exploit or a vulnerability. Workflow integration can include tasks such as initiating a ticket in a services automation platform such as ServiceNow.

Figure 12:
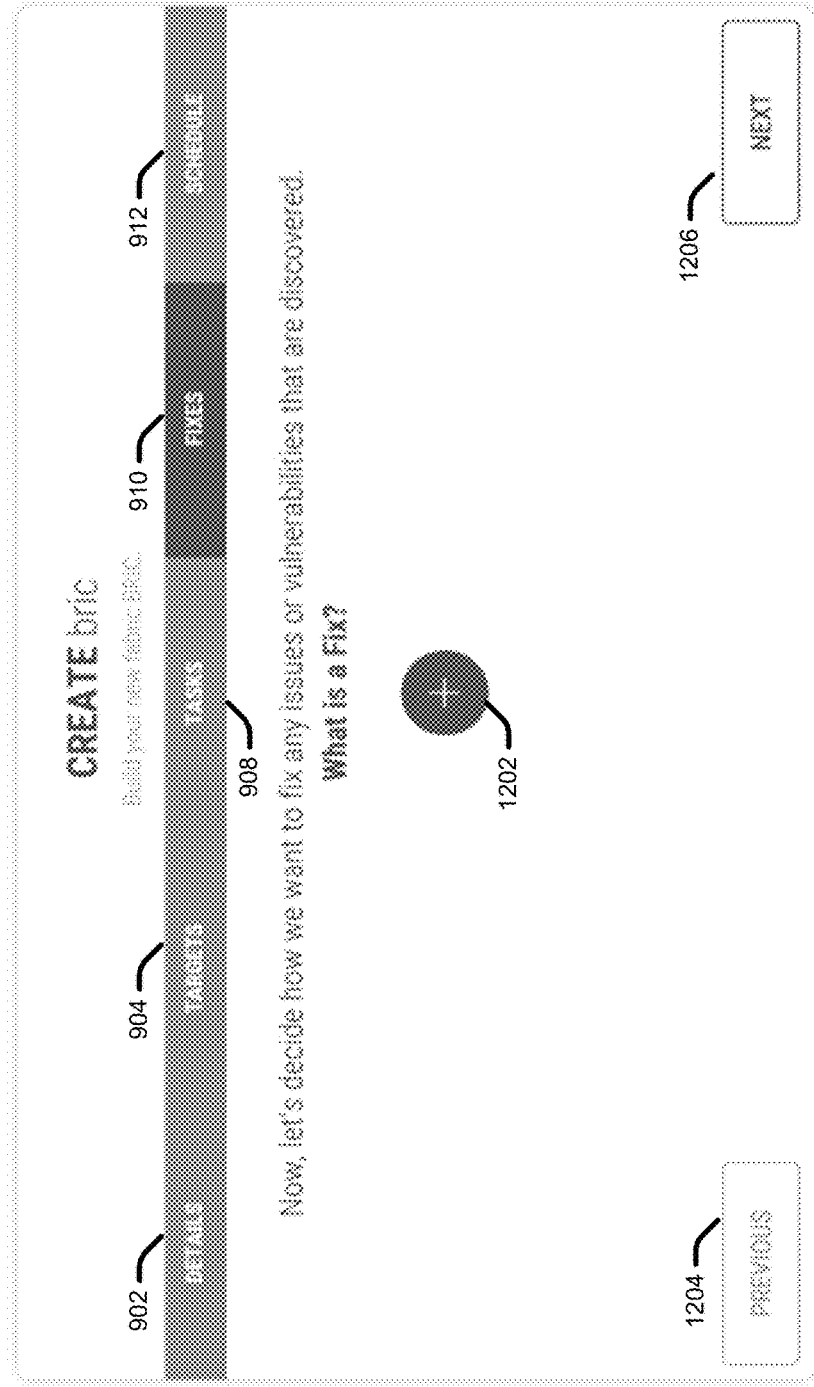
FIG. 12 illustrates an example dashboard used to help decide how to respond to any security issues and/or vulnerabilities that are identified.

FIG. 12 illustrates a user interface in the form of a dashboard 1200 to define how to respond to security issues and/or vulnerabilities that were identified. To that end, an administrator may add 1202 different parameters by selecting an icon (e.g., represented by the plus icon 1202) to define what a fix comprises. A fix may include any appropriate action based on the tools and knowledge available to the security system. A fix may be as simple as closing a communication port, deleting some data, or halting one or more aspects of the business enterprise (such as purchasing or processing payments). Other fixes may involve time consuming human intervention or machine learning to identify complex intricate problems. In other scenarios, a fix may be alerting an appropriate administrator to resolve the security threat.

An administrator may invoke the schedule block 912 by selecting the next icon 1206, or return to the tasks block 908 by selecting the previous icon 1204. In one embodiment, an administrator using the dashboard may skip to any section by selecting the appropriate block on the dashboard 1200.

Figure 13:
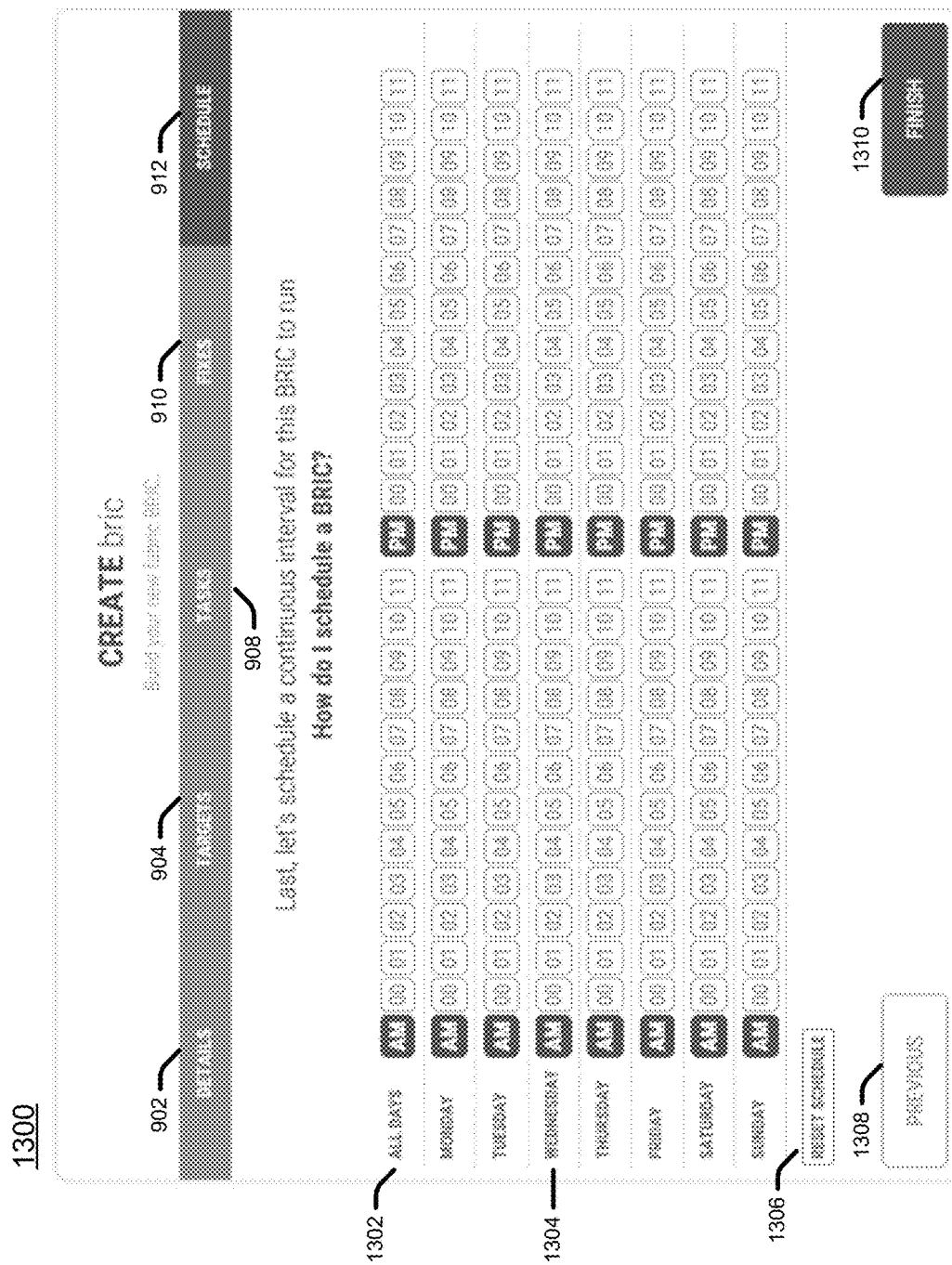
FIG. 13 illustrates an example dashboard used to create a schedule for a BRIC.

FIG. 13 illustrates a user interface in the form of a dashboard 1300 to create a schedule for a BRIC. As the name implies, the wizard provides guidance via the dashboard 1300 for an administrator to provide the time, date, and frequency of the execution of the BRIC being created or modified. In various embodiments, the schedule may be periodic (i.e., repeat at predetermined intervals) or may be a single event. To that end, an administrator may select various days (e.g., all days 1302) or specific days, such as Wednesday 1304 at a predetermined day to execute the BRIC. In various embodiments, there is a reset icon 1306 to delete the last or all entries of the schedule.

At any point, an administrator may return to the fixes block 910 by selecting the previous icon 1308. In one embodiment, an administrator using the dashboard 1300 may return to any section by selecting the appropriate block on the dashboard 1300.

FabricHUB Dashboard

FabricHUB™ provides a powerful new developer-defined security capability that seamlessly integrates into existing continuous a development/delivery workflow of a business enterprise. It allows a developer to build more secure applications faster with various popular tools like Github and Jenkins. FabricHUB™ allows a business enterprise to leverage the same BRICs that are being used in production for application development to ensure that end-user applications are delivered securely.

Figure 14:
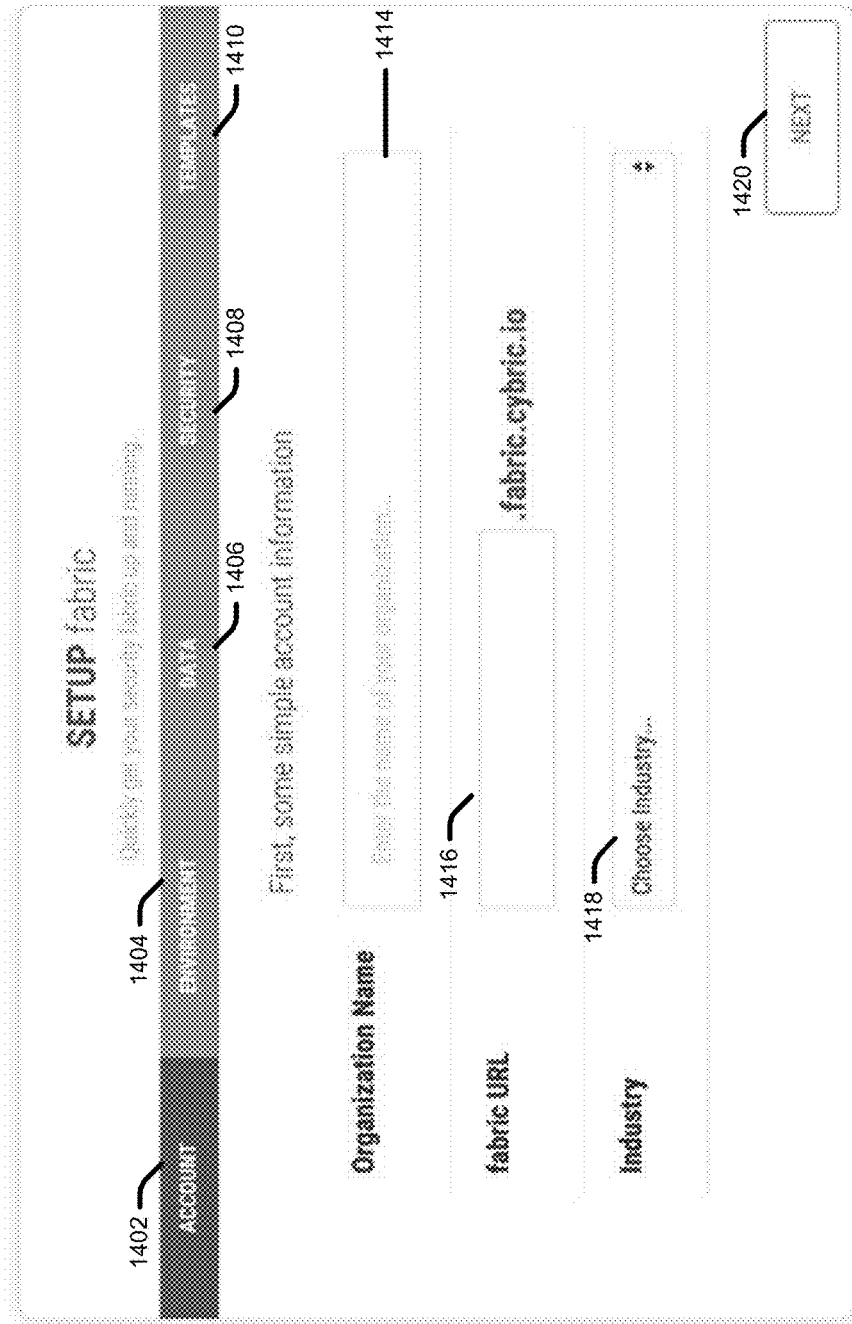
FIG. 14 illustrates an example dashboard used to create a security fabric.

FIG. 14 illustrates a user interface in the form of a dashboard 1300 to create a security fabric. The heading portion illustrates that the data entry into the wizard may be divided into different sections, such as an account block 1402, an environment block 1404, a data block 1406, a security block 1408, and a templates block 1410. The accounts page of the dashboard 1400 provides a field 1414 to provide a name for the name of the organization 1414, and a field 1416 for the target asset located on the premises of the business enterprise or on a cloud. The target asset is replicated (e.g., mirrored) at a separate location. In one embodiment, the separate location is identified with a predetermined extension, (e.g., .fabric.cybric.io), which specifies the mirror URL.

The dashboard 1400 may also include a field for the industry 1418, which may be an entry field or a scroll menu. In various embodiments, the industry is queried by the wizard to more accurately filter the appropriate test(s) to perform and/or the safeguard software package(s) to use. For example, a bank enterprise may have different concerns than that of a retail establishment.

The administrator may go to the next page of the dashboard by selecting the next icon 1420 or by selecting the target icon (e.g., environment 1404, data 1406, security 1408, and templates 1410) directly. The same concept applies for the dashboards of FIGS. 15 to 18 discussed below and is therefore not repeated for brevity.

Figure 15:
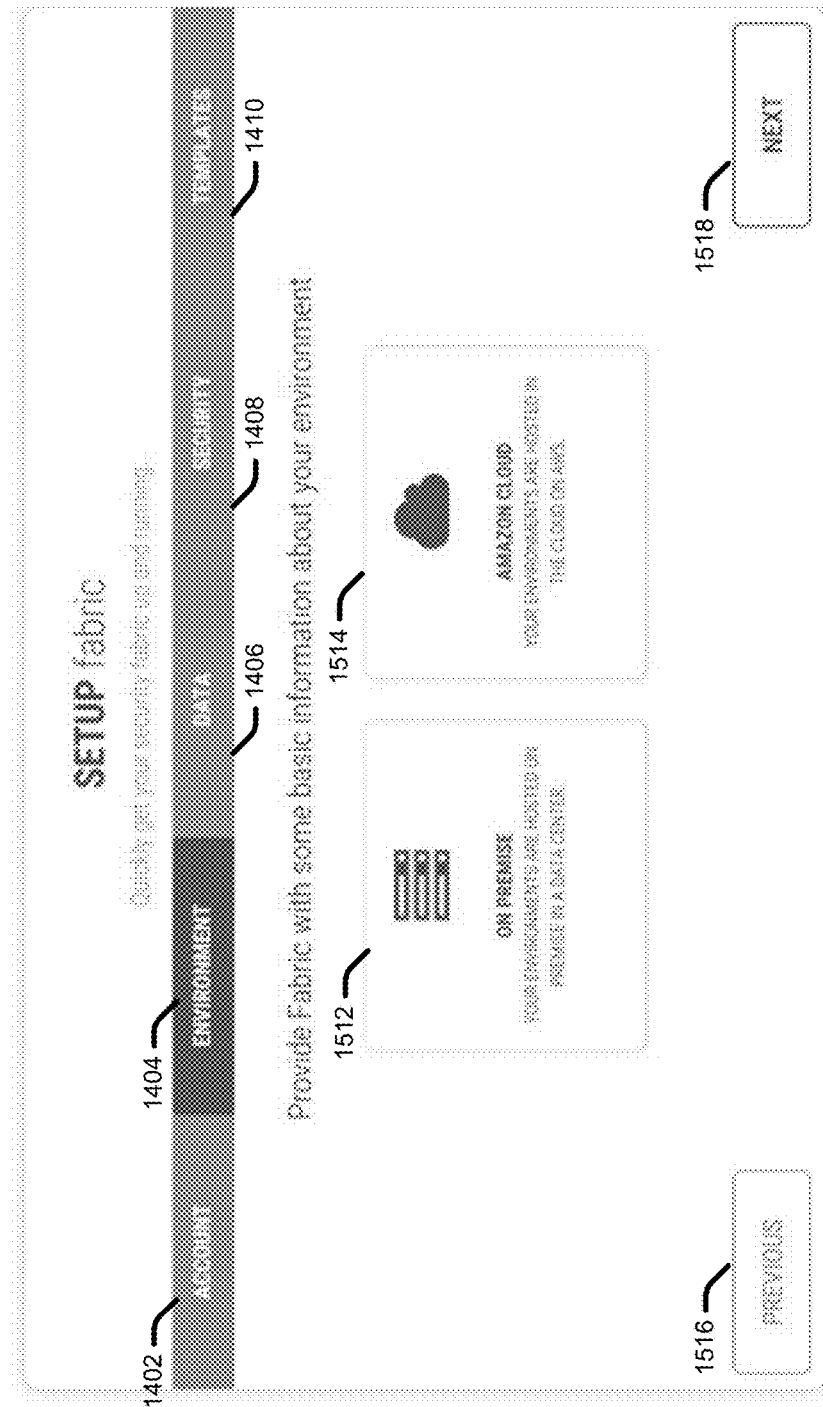
FIG. 15 illustrates an example dashboard used to identify some basic information about the target environment to be protected.

FIG. 15 illustrates a user interface in the form of a dashboard 1500 to identify some basic information about the target environment to be protected. More particularly, it determines whether the target asset to be protected is on the premise 1512 (e.g., hosted on a data center of the business enterprise) or on a cloud, such as Amazon cloud 1514. Accordingly, an administrator may identify the location of the asset to be protected by selecting the icon representing appropriate environment.

Figure 16:
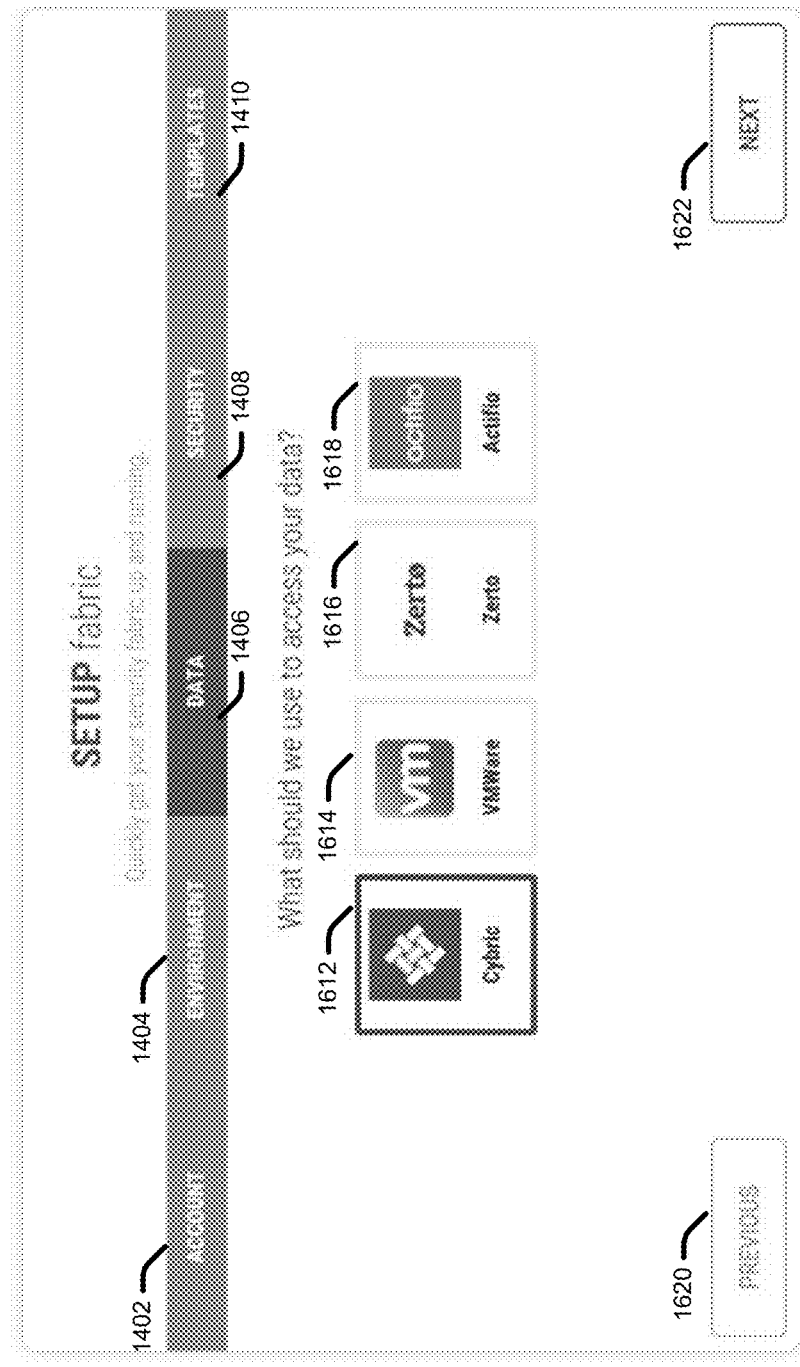
FIG. 16 illustrates an example dashboard used to determine security tools to use to access the asset data.

FIG. 16 illustrates a user interface in the form of a dashboard 1600 to determine the security tool(s) to use for accessing the asset data. To that end, various tools may be provided. These tools are not limited to a particular vendor (such as Cybric 1612); rather, they may extend to third party vendors such as VMWare 1614, Zerto 1616, and Actifio 1618. In various embodiments, the tools used to access the target data may be from a predetermined list or may be dynamically determined by the wizard. More particularly, wizard determines whether the target asset to be protected is on the premise 1512 (e.g., hosted on a data center of the business enterprise) or on a cloud, such as amazon cloud 1514. Accordingly, an administrator may identify the location of the asset to be protected by selecting the appropriate environment.

Figure 17:
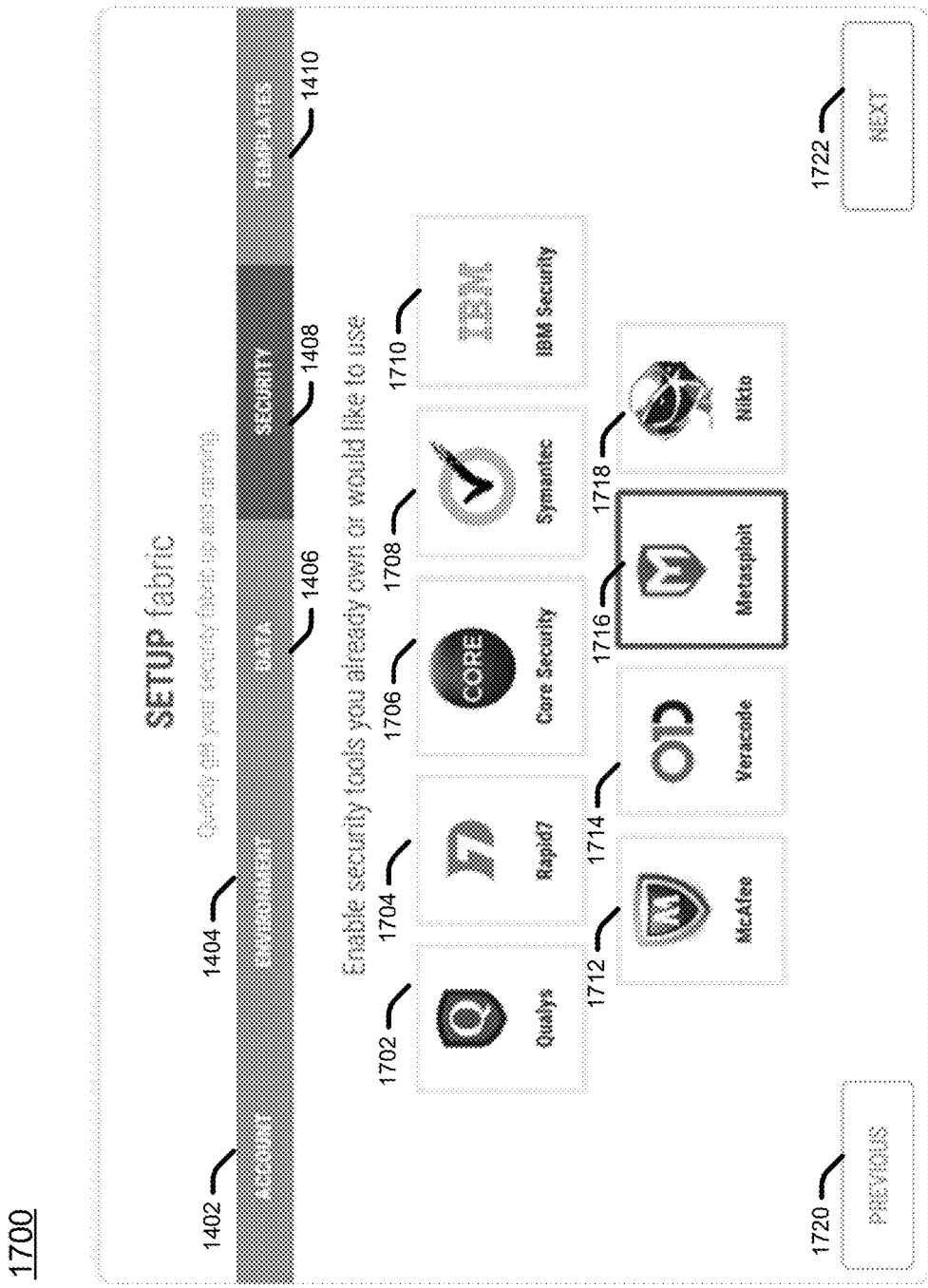
FIG. 17 illustrates an example dashboard used to select the security tools that are already owned by the business enterprise.

FIG. 17 illustrates a user interface in the form of a dashboard 1700 for the administrator to select the security tools, sometimes referred to herein as the safeguard software packages, that are already owned by the business enterprise. As discussed previously, BRICs can be fully customized, modified from an existing template, or collected from security vendors for incorporation into a security catalog to automate and enforce a business enterprise's security practices. Through the security menu of the dashboard 1700 an administrator is able to view and select safeguard software packages provided by third-party security vendors such as Qualys 1702, Rapid7 1704, Core Security 1706, Symantec 1708, IBM Security 1710, McAfee 1712, VeraCode 1714, Metasploit 1716, Nikto 1718, etc. Accordingly, an administrator may select one or more security tools such as Metasploit 1716 and/or core security 1706 for a BRIC.

Figure 18:
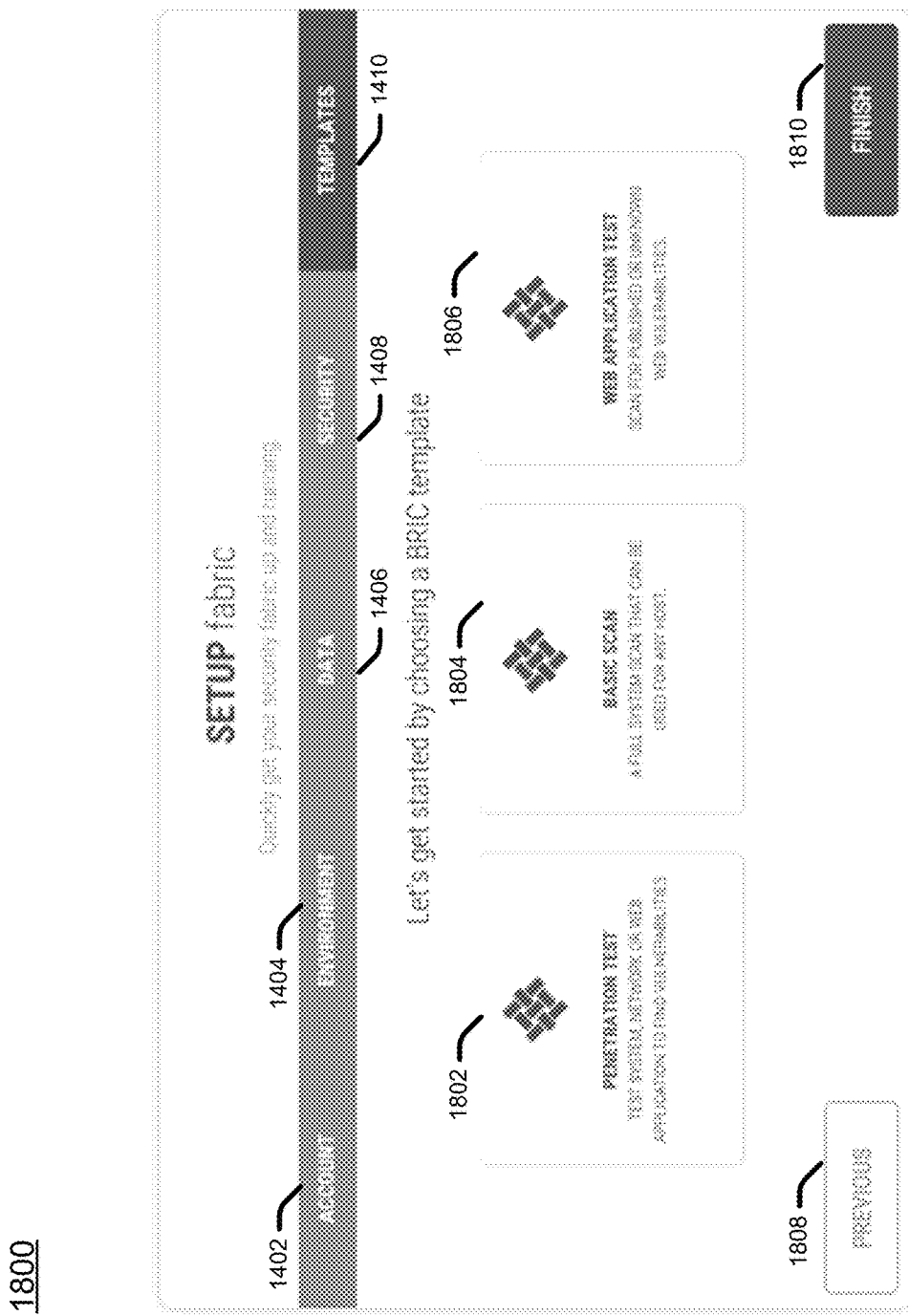
FIG. 18 illustrates an example dashboard used to initiate a BRIC template.

FIG. 18 illustrates a user interface in the form of a dashboard 1800 to initiate a BRIC template. To that end, a user may select between different tests to be performed by the BRIC, such as a penetration test 1802, a basic scan 1804, and a WEB application test 1806. In the penetration test 802, an asset, such as a system, network, or web application, is tested to find security vulnerabilities. As used herein a penetration test 1802 relates to a method of testing, measuring, and enhancing established security measures on information systems and support areas of a business enterprise.

A basic scan 1804 relates to a (e.g., full) system scan that can be used for any host. A WEB application test 1806 relates to a scan for published or unknown WEB vulnerabilities.

Integrations Dashboard

Figure 19:
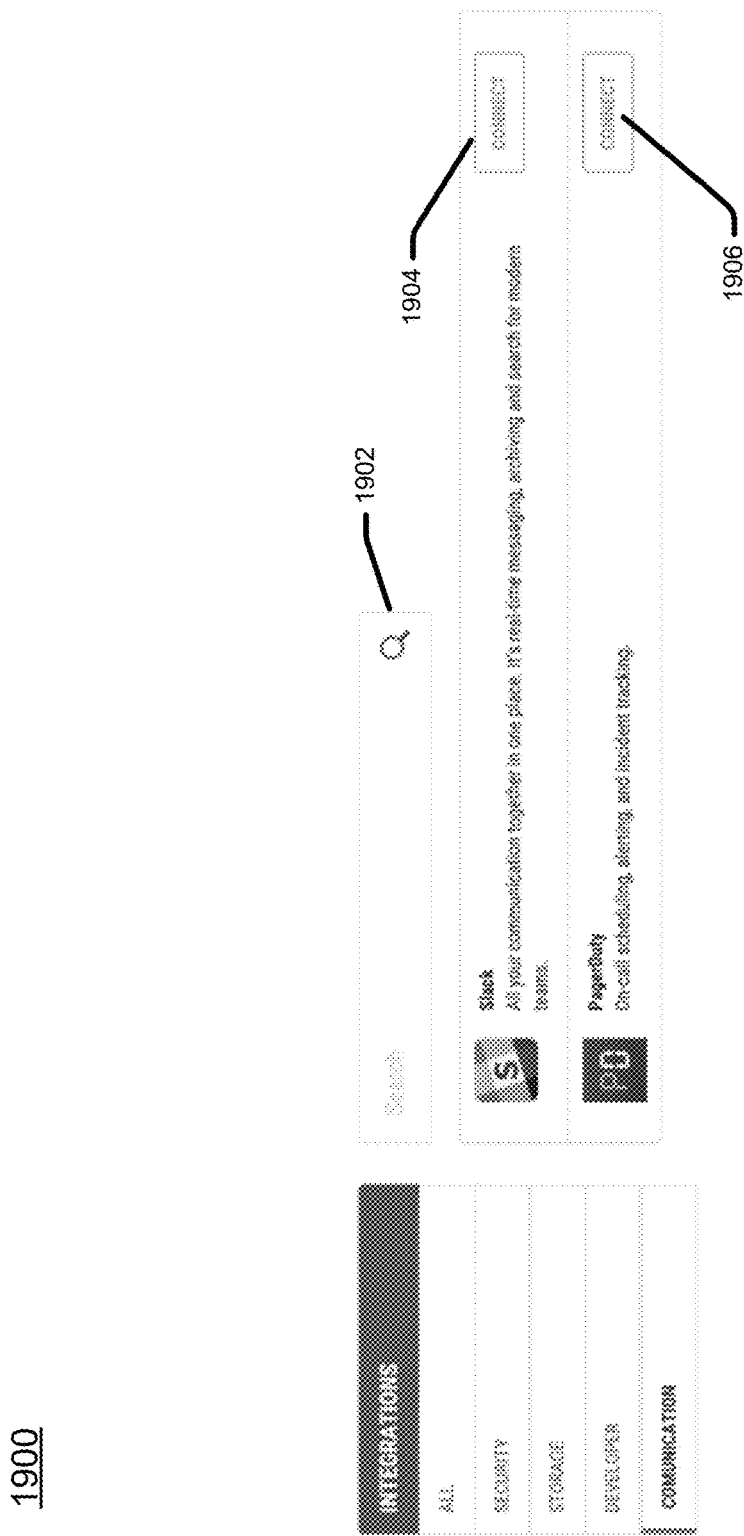
FIG. 19 illustrates an example dashboard used to tailor the format, timing, and the destination of alerts and notifications.

FIG. 19 illustrates a user interface in the form of a dashboard 1900 to tailor the format, timing, and the destination of the alerts and notifications. For example, the communication interface of the integrations feature of the wizard may provide different tools for interfacing with a recipient (e.g., administrator) of the alerts/messages.

The administrator setting up this aspect of the integration, may search for the appropriate tool by entering the name of the tool to be searched in a field 1904. Alternatively or in addition, several tools may be prepopulated and offered for selection to the administrator. For example, the tool Slack 1904 offers persistent chat rooms organized by topic, as well as private groups and direct messaging. Content inside Slack is searchable, including files, conversations, and people. Slack has the ability of integrating with a large number of third-party services and supports community-built integrations.

An administrator may also connect with PagerDuty 1906, which is an incidence response and alerting service that lessens the communications task for IT infrastructure management teams. Slack 1904 and PagerDuty 1906 are included in FIG. 19 by way of example only and not limitation. Accordingly, different ways of the business enterprise being notified may being provided via the communication interface dashboard 1900.

Figure 20:
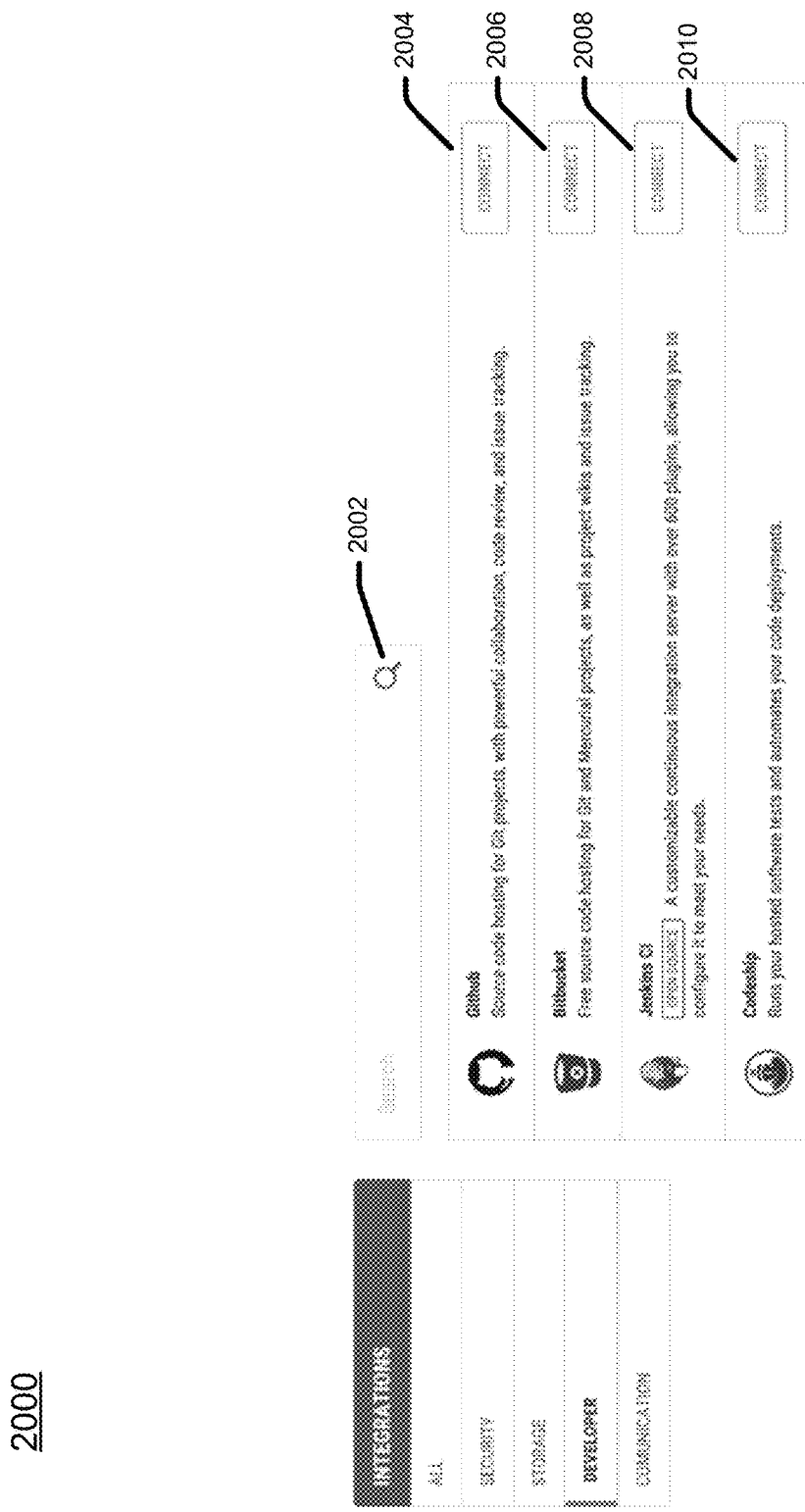
FIG. 20 illustrates an example dashboard used to identify different platforms to provide custom code.

FIG. 20 illustrates a user interface in the form of a dashboard 2000 to identify different platforms to provide custom code. To that end, the developer feature of the wizard may provide different platforms for the administrator to choose from.

The administrator setting up this aspect of the integration, may search for the appropriate platform by entering the name of the platform to be searched in a field 2004. Alternatively or in addition, several platforms may be prepopulated and offered for selection. For example, the administrator may select Github 2004, which provides source code hosting for Git projects, with powerful collaboration, code review, and security issue tracking. The GitHub platform is a WEB based Git repository hosting service. Among other things, it offers the distributed revision control and source code management functionality of Git. Bitbucket 2006, Jenkins 2008, and Codeship 2010 provide similar development platforms. The platforms identified in FIG. 20 are provided by way of example only, not by way of limitation.

Figure 21:
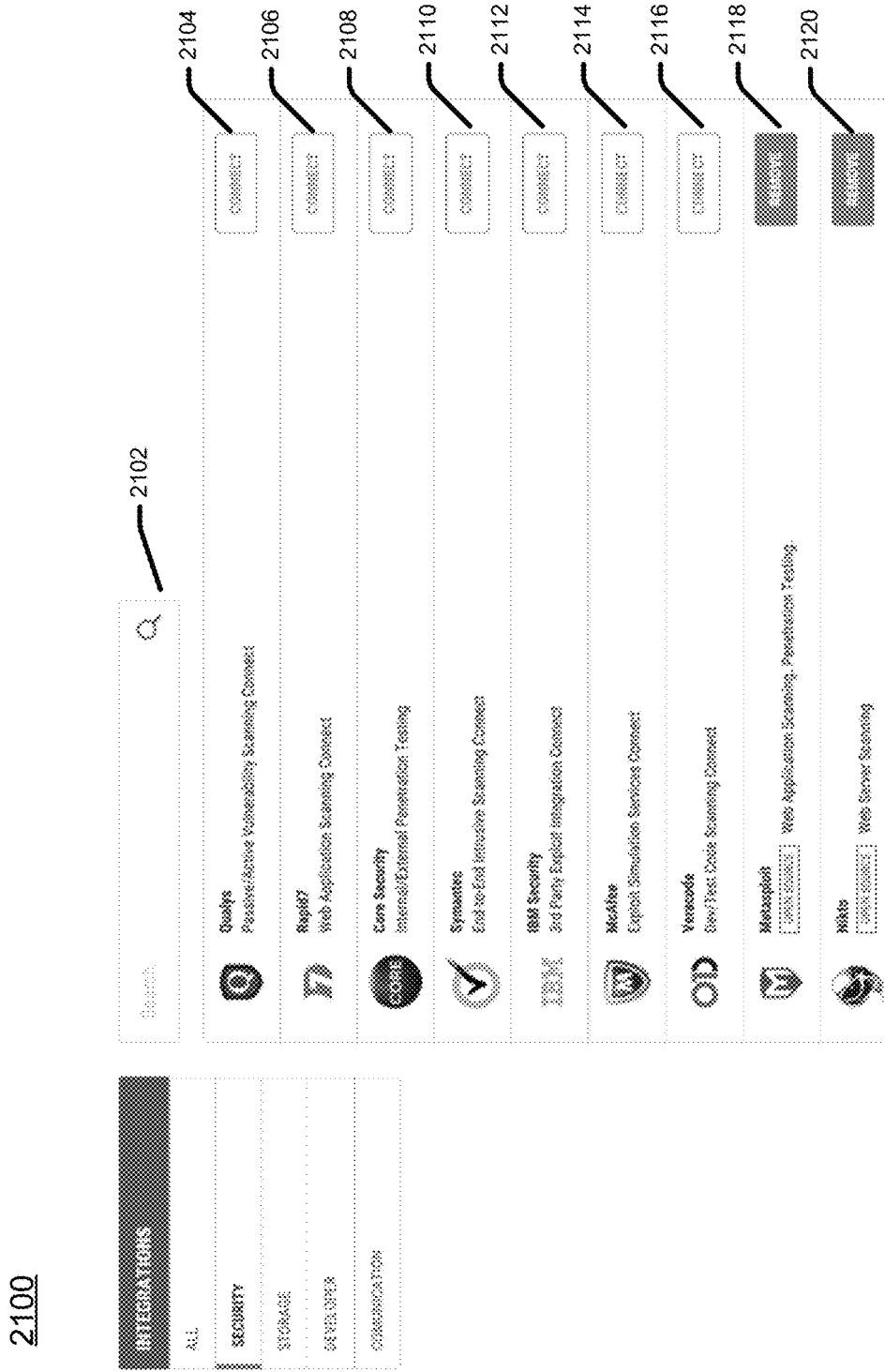
FIG. 21 illustrates an example dashboard used to select different security tools.

FIG. 21 illustrates a user interface in the form of a dashboard 2100 to select different security tools, sometimes referred to herein as safeguard software packages. To that end, the developer feature of the Wizard may provide different platforms for the administrator to choose from.

The administrator setting up this aspect of the integration, may search for the appropriate tool by entering the name of the tool to be searched in a field 2102. Alternatively or in addition, the wizard may dynamically determine the security tools used by the business enterprise that are relevant for the present scenario and offer them for selection. Through the security menu of the dashboard 2100, an administrator is able to view and select safeguard software packages provided by third-party security vendors, such as Qualys 2104, Rapid7 2106, Core Security 22108, Symantec 2110, IBM Security 2112, McAfee 2114, VeraCode 2116, Metasploit 2118, Nikto 2120, etc. In one embodiment, the dashboard 2100 provides for the removal of the security tools that the administrator may deem not necessary.

CONCLUSION

The Continuous Security Delivery Fabric discussed herein automates and orchestrates security best practices in a business enterprise network environment. Creating a shadow environment against which security functions can be applied lends itself to use cases beyond finding and patching vulnerabilities. It includes the ability to validate system integrity without impacting the availability and performance of production environments, relevant for transaction-intensive, mission-critical applications. The central operating convention of a BRIC and the ability to instrument preexisting security controls represents a framework approach that unifies visibility and control across the increasingly complex IT landscape. In terms of integrations and extensible APIs, the continuous security delivery fabric enables a DevOps approach to security automation, providing a level of operational efficiency that is aligned with the fundamental value proposition of the cloud: agility.

The user interface has a dashboard that includes a wizard that guides a user through an intuitive and workflow-centric questions/options. The CSDF employs this approach for automating and optimizing enterprise vulnerability and exploit detection and remediation.

Appendix A, which is included as an integral part of this application, provides documents describing several specific examples of systems/services, which include at least some aspects of the technology described above and is given by way of additional non-limiting example only.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to remediate information technology installation security issues, comprising:
   receiving a selection of a componentized security policy, wherein the componentized security policy includes one or more encapsulated security routines orchestrating a performance of at least one security function;
   executing one or more encapsulated security routines of the componentized security policy against a shadow environment that is a mirror instance of an enterprise installation instance, in which the enterprise installation instance includes one or more software systems that automate operations of an enterprise;
   receiving results from performance of the at least one security function orchestrated by the one or more encapsulated security routines included in the componentized security policy; and
   inferring an existence of at least one security issue based at least on the results.

2. The method of claim 1, further comprising scheduling a time for the one or more encapsulated security routines of the componentized security policy to be executed.

3. The method of claim 1, further comprising receiving a selection of a second componentized security policy and executing one or more additional encapsulated security routines of the second componentized security policy against the shadow environment.

4. The method of claim 3, further comprising scheduling a plurality of times for the one or more encapsulated security routines of the componentized security policy and the one or more encapsulated security routines of the second componentized security policy to be performed such that one or more security functions orchestrated by at least one encapsulated security routine of either the componentized security policy or the second componentized security policy is performed against the shadow environment a majority of the time.

5. The method of claim 4, wherein the one or more encapsulated security routines of the componentized security policy and the one or more encapsulated security routines of the second componentized security policy to be performed are such that security functions orchestrated by encapsulated security routines of the componentized security policy and the second componentized security policy are performed against the shadow environment on a continuous basis.

6. The method of claim 4, further comprising aggregating the results of the one or more encapsulated security routines of the componentized security policy and additional results of the one or more additional encapsulated security routines of the second componentized security policy in an analytics data store.

7. The method of claim 6, further comprising generating at least one recommended remediation based on analyzing the results and the additional results aggregated in the analytics data store.

8. The method of claim 7, further comprising automatically performing the at least one recommended remediation.

9. The method of claim 7, wherein the at least one recommended remediation is taken from a set of responses stored in a response data store.

10. The method of claim 7, comprising receiving a selection to automatically perform the at least one recommended remediation, and storing the selection in a selection data store.

11. The method of claim 7, wherein at least one machine learning algorithm is applied against the results and the additional results aggregated in the analytics data store to determine a malfunction of the shadow environment.

12. A system, comprising:
   one or more processors; and
   memory including a plurality of computer-executable components that are executable by the one or more processors to perform a plurality of acts, the plurality of acts comprising:
   receiving a selection of a componentized security policy, wherein the componentized security policy includes a plurality of encapsulated security routines orchestrating a performance of multiple security functions;
   executing the plurality of encapsulated security routines of the componentized security policy against a shadow environment that is a mirror instance of an enterprise installation instance, in which the enterprise installation instance includes one or more software systems that automate operations of an enterprise;

receiving results from performance of the multiple security functions orchestrated by the plurality of encapsulated security routines included in the componentized security policy; and inferring an existence of at least one security issue based at least on the results.

13. The system of claim 12, wherein the plurality of acts further comprise scheduling a time for the plurality of encapsulated security routines of the componentized security policy to be executed.

14. The system of claim 12, wherein the plurality of acts further comprise receiving a selection of a second componentized security policy and executing one or more additional encapsulated security routines of the second componentized security policy against the shadow environment.

15. The system of claim 14, further comprising scheduling a plurality of times for the plurality of encapsulated security routines of the componentized security policy and the plurality of encapsulated security routines of the second componentized security policy to be performed such that at least one security functions orchestrated by at least one encapsulated security routine of either the componentized security policy or the second componentized security policy is performed against the shadow environment a majority of the time.

16. The system of claim 14, wherein the plurality of encapsulated security routines of the componentized security policy and the plurality of encapsulated security routines of the second componentized security policy to be performed are such that individual security functions orchestrated by individual encapsulated security routines of the componentized security policy and the second componentized security policy are performed against the shadow environment on a continuous basis.

17. A method to remediate information technology installation security issues, comprising:

receiving a selection of a componentized security policy, wherein the componentized security policy includes one or more encapsulated security routines orchestrating a performance of at least one security function;

executing the one or more encapsulated security routines of the componentized security policy against a shadow environment that is a mirror instance of an enterprise installation instance, in which the enterprise installation instance includes one or more software systems that automate operations of an enterprise;

receiving results from performance of the at least one security function orchestrated by the one or more encapsulated security routines included in the componentized security policy; and inferring an existence of at least one security issue based at least on the results.

18. The method of claim 17, further comprising scheduling a time for the one or more encapsulated security routines of the componentized security policy to be executed.

19. The method of claim 17, further comprising receiving a selection of a second componentized security policy and executing one or more additional encapsulated security routines of the second componentized security policy against the shadow environment.

20. The method of claim 19, further comprising scheduling a plurality of times for the one or more encapsulated security routines of the componentized security policy and the one or more encapsulated security routines of the second componentized security policy to be performed such that one or more security functions orchestrated by at least one encapsulated security routine of either the componentized security policy or the second componentized security policy is performed against the shadow environment on a continuous basis.

* * * * *